US011172108B2

(12) United States Patent
Iguchi et al.

(10) Patent No.: US 11,172,108 B2
(45) Date of Patent: Nov. 9, 2021

(54) IMAGING DEVICE

(71) Applicant: SHARP KABUSHIKI KAISHA, Sakai (JP)

(72) Inventors: Katsuji Iguchi, Sakai (JP); Koji Takahashi, Sakai (JP); Hidenori Kawanishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 158 days.

(21) Appl. No.: 16/620,472

(22) PCT Filed: May 9, 2018

(86) PCT No.: PCT/JP2018/017963
§ 371 (c)(1),
(2) Date: Dec. 6, 2019

(87) PCT Pub. No.: WO2018/230203
PCT Pub. Date: Dec. 20, 2018

(65) Prior Publication Data
US 2020/0120247 A1 Apr. 16, 2020

(30) Foreign Application Priority Data

Jun. 13, 2017 (JP) .............................. JP2017-116204

(51) Int. Cl.
*H04N 5/225* (2006.01)
*G03B 15/05* (2021.01)
*G03B 7/17* (2021.01)

(52) U.S. Cl.
CPC ........... *H04N 5/2256* (2013.01); *G03B 15/05* (2013.01); *G03B 7/17* (2015.01)

(58) Field of Classification Search
CPC .................................................. H04N 5/2256
(Continued)

(56) References Cited

U.S. PATENT DOCUMENTS 6,141,105 A 10/2000 Yahashi et al.
2005/0269481 A1 12/2005 David et al.
(Continued)

FOREIGN PATENT DOCUMENTS

JP H09-145321 A 6/1997
JP 2010-148130 A 7/2010
(Continued)

OTHER PUBLICATIONS

Niclass et al., "A 0.18-m CMOS SoC for a 100-m-Range 10-Frame/s 200 96-Pixel Time-of-Flight Depth Sensor", IEEE Journal of Solid-State Circuits, vol. 49, No. 1, Jan. 2014, pp. 315-330.

*Primary Examiner* — Joel W Fosselman
(74) *Attorney, Agent, or Firm* — ScienBiziP, P.C.

(57) ABSTRACT

Provided is an imaging device that is able to obtain a clear image in a relatively long distance in an environment of precipitation. A rainy weather camera includes: a light source that emits pulse light; a fan-shaped pulse light radiation unit that performs scanning in one direction with the pulse light emitted by the light source, spreads, in a direction perpendicular to the scanning direction, the pulse light for the scanning when the scanning is performed, and radiates the pulse light, which is in a state of being polarized in the direction perpendicular to the scanning direction, to an object; an imaging unit that receives reflection light from the object and performs exposure to a pixel; and a polarization filter that transmits light that is included in the reflection light received by the imaging unit and polarized to be parallel to the scanning direction. The imaging unit performs exposure only to a pixel which is synchronized with the scanning with the pulse light.

14 Claims, 10 Drawing Sheets

(58) Field of Classification Search
USPC .......................................................... 348/370
See application file for complete search history.

(56) References Cited

U.S. PATENT DOCUMENTS

| | | |
|---|---|---|
| 2016/0073071 A1 | 3/2016 | Nagashima et al. |
| 2016/0328854 A1 | 11/2016 | Kimura |
| 2017/0293812 A1* | 10/2017 | Itoh .................... G06K 9/00805 |

FOREIGN PATENT DOCUMENTS

| | | |
|---|---|---|
| JP | 2016-057365 A | 4/2016 |
| JP | 2016-224021 A | 12/2016 |
| WO | 2016/182985 A1 | 11/2016 |

* cited by examiner

21B: IMAGING UNIT
21b: LIGHT RECEIVING UNIT
31b: SIGNAL STORAGE PROCESSING CIRCUIT
31c: ROW SELECTION CIRCUIT
31d: CONTROL UNIT
31e: COLUMN SELECTION CIRCUIT
Cx: VERTICAL SIGNAL LINE
Cα(j): COLUMN CONTROL SIGNAL
Pxa(i,j): PIXEL
RA(i): ROW CIRCUIT
Rs(i): ROW SIGNAL
Rs(i): ROW SELECTION SWITCH

IMAGING DEVICE

TECHNICAL FIELD

The present invention relates to an imaging device that captures a clear image in an environment of rain, dense fog, snow, or the like.

BACKGROUND ART

As a method for acquiring a clear image by avoiding influence of a raindrop, a snowflake, or the like in an environment of precipitation of rain, dense fog, snow, or the like, NPL 1 proposes a method for radiating a light beam so as to thread between such falling objects.

Moreover, though not in the environment of precipitation, PTL 1 discloses an invention to reduce a shielding effect due to a water droplet such as steam. The invention proposes a method of removing reflection from a water droplet by installing polarizers on both of a radiation side and a light receiving side with making arrangement of the two polarizers different from each other by 90 degrees for a rainy weather camera.

On the other hand, PTL 2 proposes that blooming is suppressed in a camera, in which polarized light whose direction is the same as that of a light source is received, as an image sensor using the polarizers mentioned above.

CITATION LIST

Patent Literature

PTL 1: Japanese Unexamined Patent Application Publication No. 2016-224021 (published on Dec. 28, 2016)
PTL 2: Japanese Unexamined Patent Application Publication No. 2010-148130 (published on Jul. 1, 2010)

Non Patent Literature

NPL 1: de Charette, R., Tamburo, R., Barnum, P. C., Rowe, A., Kanade, T., Narasimhan, S. G., "Fast Reactive Control for Illumination Through Rain and Snow." IEEE International Conference on Computational Photography (ICCP), Seattle, Wash. 2012

SUMMARY OF INVENTION

Technical Problem

However, the above-described conventional techniques have the following problems.

In order for a light beam to thread between falling objects (raindrops, snowflakes, or the like) that are accompanied with precipitation or between water droplets (fog) that float in air and to go to and come back from an object, first, it is required to measure positions of the raindrops which matter. Thus, it is required to photograph a target visual field with high resolution. Furthermore, it is required that a space from a closest position to a farthest distance that is a target is in focus, so that a camera system that has extremely high definition and high accuracy and is expensive is needed. Moreover, it is required to analyze an image that is obtained, extract all raindrops, and calculate positions thereof. Thus, it is required that the camera system operates at a high speed. Additionally, a processor having an advanced processing capability is also required for image processing, so that the system has no choice to be extremely expensive. Accordingly, a device that is simpler and inexpensive is needed.

Here, a method for eliminating influence of a water droplet with a simple system by utilizing polarization is simple as a system, and cost thereof is low. However, since an entire visual field is irradiated with laser light, irradiation intensity is significantly lowered in a distant place, so that a measurement range is restricted to a short distance. Moreover, direct reflection light from a water droplet is able to be removed, but a signal of reflection light from an object or the water droplet, which is received after being reflected by another object, is not able to be removed.

As a result, in the conventional system, there is a problem that it is difficult to acquire a good image, except for a case where an object has few noise components caused by multireflection and is in a short distance.

The invention is made in view of the aforementioned conventional problems and an object thereof is to provide an imaging device that is able to obtain a clear image in a relatively long distance in an environment of precipitation.

Solution to Problem

In order to solve the aforementioned problems, an imaging device of an aspect of the invention includes: a light source that emits pulse light; a radiation unit that performs scanning in one direction with the pulse light emitted by the light source, spreads, in a direction perpendicular to the scanning direction, the pulse light for the scanning when the scanning is performed, and radiates the pulse light, which is in a state of being polarized in the direction perpendicular to the scanning direction, to an object; an imaging unit that receives reflection light from the object and performs exposure to a pixel; and a polarization filter that transmits light that is included in the reflection light received by the imaging unit and polarized to be parallel to the scanning direction, in which the imaging unit performs exposure only to a pixel which is synchronized with the scanning with the pulse light.

Advantageous Effects of Invention

According to an aspect of the invention, an effect that an imaging device which is able to obtain a clear image in a relatively long distance in an environment of precipitation is able to be provided is exerted.

DESCRIPTION OF EMBODIMENTS

Embodiment 1

An embodiment of the invention will be described as follows with reference to FIGS. 1 to 6.

(Outline of Rainy Weather Camera)

Figure 1:
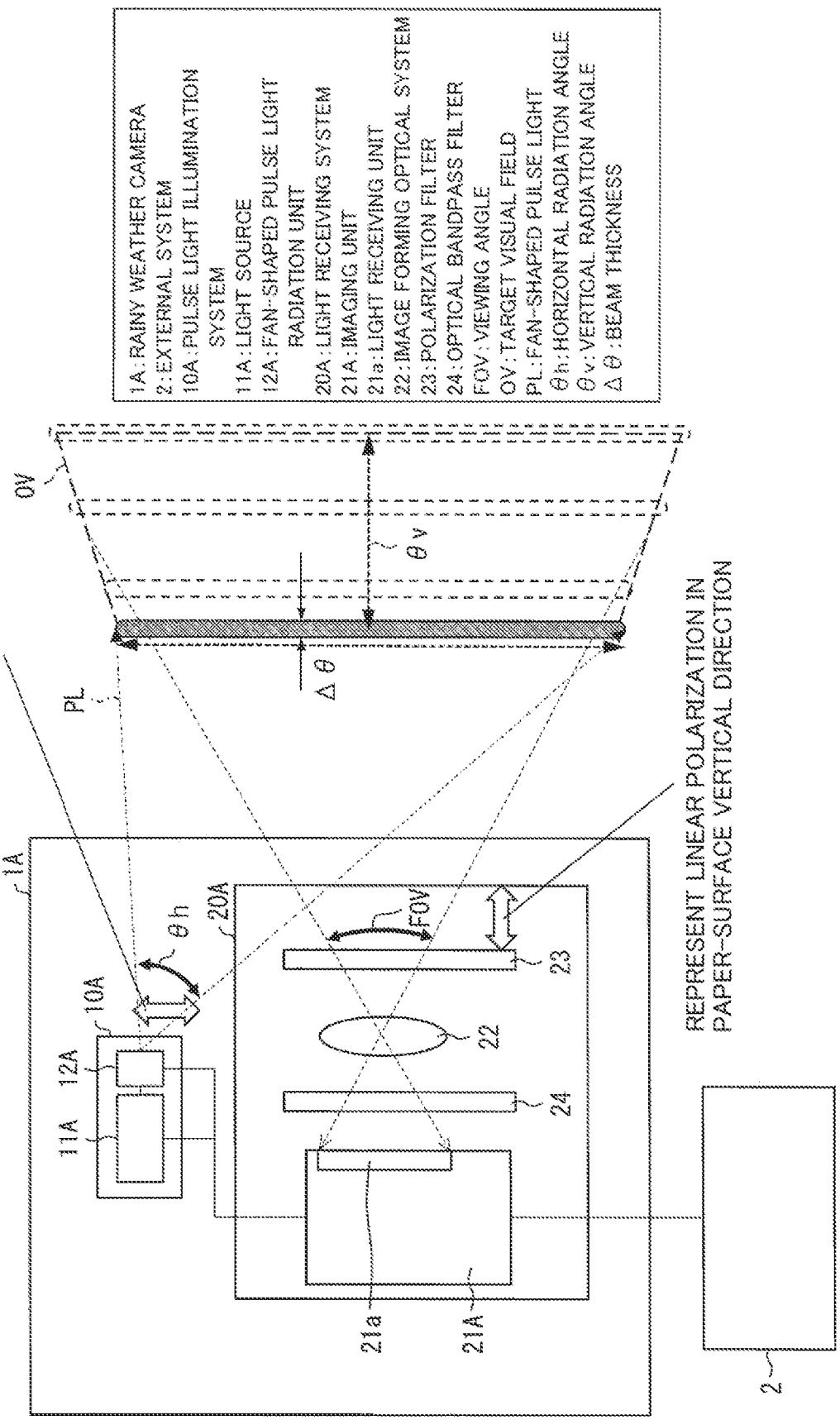
FIG. 1 is a block diagram illustrating an entire configuration of a rainy weather camera in Embodiment 1 of the invention.

An entire configuration of a rainy weather camera 1A that serves as an imaging device of the present embodiment will be described with reference to FIG. 1. Note that, hereinafter, a name of "rainy weather camera" is used for a camera for an environment with precipitation of rain, dense fog, snow, or the like, but there is no limitation to the rain. Moreover, the imaging device of the present embodiment may be a camera that captures a still image, or may be a moving image photographing device that photographs a moving image. FIG. 1 is a block diagram illustrating the entire configuration of the rainy weather camera 1A of the present embodiment. Note that, FIG. 1 illustrates the entire configuration of the rainy weather camera 1A as seen from above.

As illustrated in FIG. 1, the rainy weather camera 1A as the imaging device of the present embodiment includes a pulse light illumination system 10A that irradiates a target visual field OV with fan-shaped pulse light PL and a light receiving system 20A that receives light from at least a part of the target visual field OV.

The pulse light illumination system 10A includes a light source 11A that emits pulse light and a fan-shaped pulse light radiation unit 12A that irradiates the target visual field OV with the pulse light emitted from the light source 11A in a horizontal direction in a fan shape and performs scanning in a vertical direction.

The light source 11A includes, for example, a semiconductor laser chip that emits light from an end surface, and radiates pulse light that is polarized in a direction parallel to a semiconductor active layer.

The fan-shaped pulse light radiation unit 12A spreads the pulse light emitted from the light source 11A in the horizontal direction into the fan shape, performs one-dimensional scanning in the vertical direction, that is, a longitudinal direction, and thereby irradiates the entire target visual field OV.

The light receiving system 20A includes an imaging unit 21A that includes a light receiving unit 21a, an image forming optical system 22 that forms an image on the light receiving unit 21a of the imaging unit 21A, and a polarization filter 23 that is in front of, that is, on the outside of the image forming optical system 22.

The imaging unit 21A has functions of controlling the pulse light illumination system 10A, performing communication with an external system 2, and the like, in addition to a function related to image capturing.

The polarization filter 23 is disposed so as to transmit light that is linearly polarized in a direction parallel to a scanning direction with the fan-shaped pulse light PL. Specifically, in the present embodiment, the light source 11A emits the fan-shaped pulse light PL that is linearly polarized in a direction perpendicular to the scanning direction. Whereas, the polarization filter 23 of the light receiving system 20A is disposed so as to transmit light of the fan-shaped pulse light PL, which is linearly polarized in the direction parallel to the scanning direction.

Note that, in the present specification, for easy understanding, description is given on the premise that polarization is linear polarization, but the polarization is not limited to the linear polarization in the strict sense, and includes elliptical polarization whose ellipticity is relatively small. Even in a case of the elliptical polarization, when the ellipticity is small, an effect described in the present specification is able to be obtained. For example, when the ellipticity is $1/\sqrt{10}$ ($=0.316$), intensity of light that is polarized in a minor axis direction is $\frac{1}{10}$ of intensity of light that is polarized in a major axis direction. Thereby, though influence of about 10% remains, a great effect is able to be obtained.

(Pulse Light Illumination System)

Hereinafter, a detailed structure in the rainy weather camera 1A of the present embodiment will be described in order. First, the pulse light illumination system 10A will be described in detail.

As illustrated in FIG. 1, the fan-shaped pulse light PL that is emitted from the pulse light illumination system 10A is spread into the fan shape in a horizontal plane, and a spread angle thereof is set as θh. On the other hand, a spread angle of the fan-shaped pulse light PL in the vertical direction is small and a beam thickness thereof is set as Δθ (full width at half maximum) here. Note that, the spread angle in the horizontal plane θh>>the beam thickness Δθ (full width at half maximum) is provided.

The fan-shaped pulse light radiation unit 12A is used to perform scanning with the fan-shaped pulse light PL at a spread angle in the perpendicular or vertical direction θv, making it possible to sequentially radiate the light to the target visual field OV at the spread angle in the horizontal plane θh and the spread angle in the vertical direction θv. Note that, the spread angle in the vertical direction θv>the beam thickness Δθ (full width at half maximum) is provided.

Here, in the following description, in a case where pieces of fan-shaped pulse light PL to be radiated at different angles in the vertical direction need to be distinguished from each other, the pieces of fan-shaped pulse light PL are denoted as fan-shaped pulse light PL-1 to fan-shaped pulse light PL-Ns. Ns indicates a total number of times of scanning in the vertical direction. Note that, the fan-shaped pulse light PL-1 to the fan-shaped pulse light PL-Ns are used to perform scanning in the vertical direction, so that most optical paths thereof are inclined from the horizontal plane. However, the spread angle in the horizontal plane θh>the spread angle in the vertical direction θv is assumed, and an optical path parallel to the horizontal plane is also included, so that the expression of "fan-shaped pulse light is spread in the horizontal plane" is used below in some cases.

Normally, the spread angle in the horizontal plane θh>the spread angle in the vertical direction θv is provided, and even in a case where all of scanning in the vertical direction is not completed, it is possible to detect many of objects in the target visual field OV by initial partial scanning. That is, a case where an obstacle to be detected floats in air is rare and there are many cases where the obstacle stands in the vertical direction on a road surface or the ground. Thus, for example, when the fan-shaped pulse light PL is radiated just parallel to the horizontal plane from a low height, most obstacles are able to be detected. Accordingly, an obstacle is able to be detected early before a period of one field, which is a period for performing all of scanning at the spread angle in the vertical direction θv, ends.

The fan-shaped pulse light PL is preferably uniform in the target visual field OV, but there is a tendency that detection sensitivity in a place where light intensity is strong is high. Thus, in a case where there is a place that needs to be particularly gazed in the target visual field OV, the fan-shaped pulse light PL is also able to have light intensity distribution in which intensity near the place is increased. In a case where the rainy weather camera 1A is mounted on, for example, an automobile, and a traveling direction is monitored, the horizontal direction needs to be gazed, and it is preferable that pulse light intensity in a narrow range of angles with the horizontal plane as a center is increased. In a region where a downward deflection angle is large, a nearby road surface is illuminated with the pulse light PL, so that the pulse light intensity may be low. The range of angles is 10 degrees or less, and more preferably 5 degrees or less.

Figure 2:
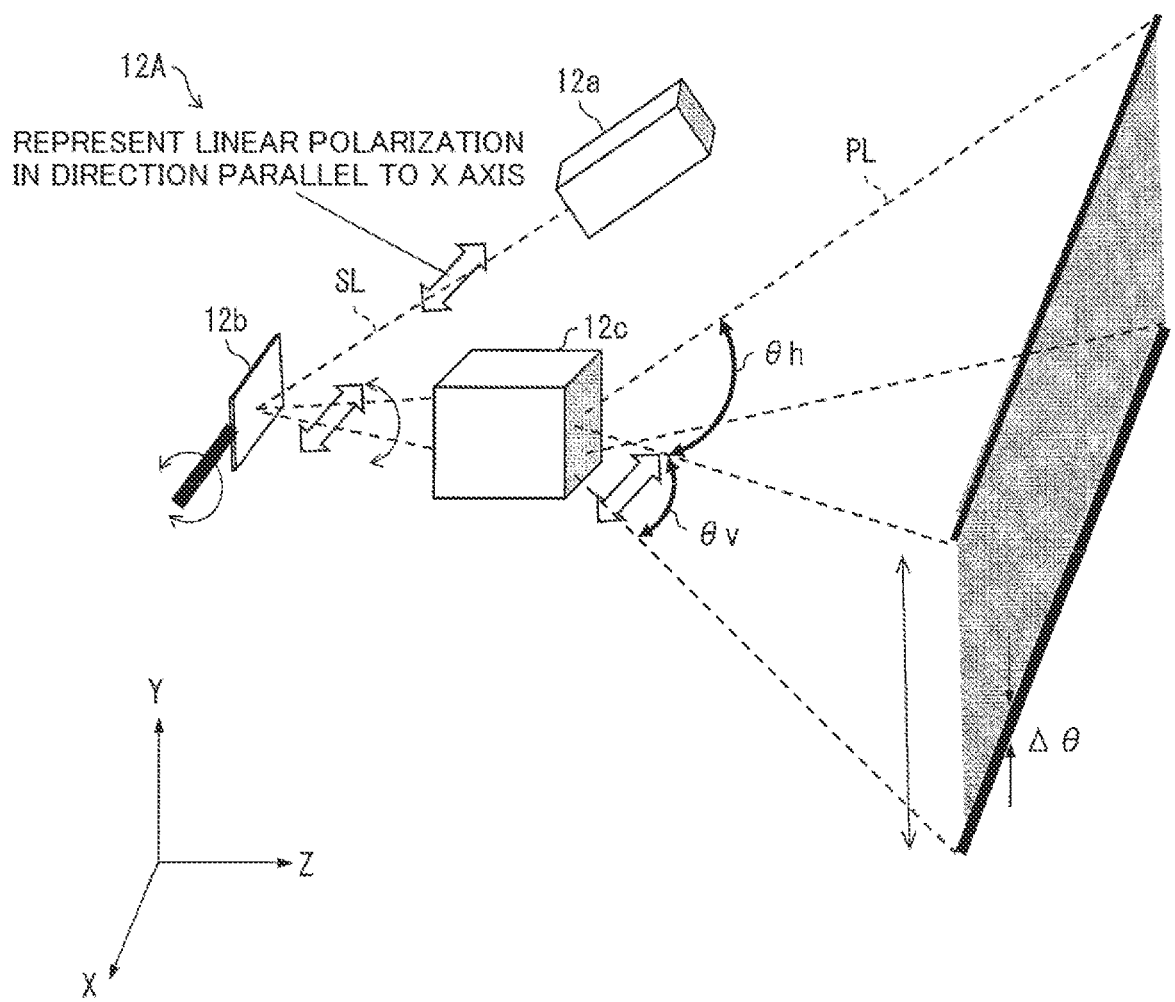
FIG. 2 is a perspective view illustrating a configuration of a fan-shaped pulse light radiation unit of a pulse light illumination system included in the rainy weather camera.

Here, a configuration of the fan-shaped pulse light radiation unit 12A of the pulse light illumination system 10A will be described in detail with reference to FIG. 2. FIG. 2 is a perspective view illustrating the configuration of the fan-shaped pulse light radiation unit 12A of the pulse light illumination system 10A.

As illustrated in FIG. 2, the fan-shaped pulse light radiation unit 12A includes at least a collimate light generator 12a that shapes light from the light source 11A into almost parallel spot light SL (in a Y-Z plane), a one-dimensional scanning device 12b that deflects the spot light SL in the vertical direction (Y direction: longitudinal direction), and a fan-shaped beam generator 12c that spreads the spot light SL, a traveling angle of which in the vertical direction is changed by the one-dimensional scanning device 12b, into the fan shape in the horizontal direction.

As described above, the light source 11A radiates the pulse light, which is polarized in the direction parallel to the semiconductor active layer, from the semiconductor laser chip that emits light from the end surface. In this case, a polarization direction is able to be controlled by a rotation angle around an optical axis of the semiconductor laser chip. In FIG. 2, the active layer of the semiconductor laser chip is disposed to be parallel to an X-axis. The collimate light generator 12a includes a not-illustrated collimator lens and keeps a polarization state of the light source 11A. For example, in a case where VCSEL (Vertical Cavity Surface Emitting LASER) is used as the light source 11A, since the laser has a specific linear polarization state depending on a shape of a cavity or crystal orientation of a semiconductor crystal, the VCSEL may be set so that linear polarization of the VCSEL is parallel to the X-axis.

The one-dimensional scanning device 12b is constituted by, for example, a MEMS (Micro Electro Mechanical Systems) mirror element including a reflection surface that rotationally moves about one axis (which is set as the X-axis) in the horizontal plane (X-Z plane). A polarization direction of the spot light SL which is incident on the reflection surface of the one-dimensional scanning device 12b is parallel to the reflection surface, so that a polarization state thereof is not changed by reflection.

The fan-shaped beam generator 12c includes, for example, a Powell lens. For example, the spot light SL whose divergence angle is about 0.05 degrees and whose diameter at an entry of the Powell lens with an aperture of 6 mm is about 0.8 mm is formed by the collimate light generator 12a. Then, the spot light SL is formed so that laser light is deflected by ±12 degrees with respect to the horizontal plane by the one-dimensional scanning device 12b constituted by the MEMS mirror element. The Powel lens radiates the laser light at the spread angle in the horizontal plane θh=32 degrees and a divergence angle=0.05 degrees, so that the fan-shaped pulse light PL is able to be radiated to a range with the spread angle in the horizontal plane θh=32 degrees and the spread angle in the vertical direction θv=24 degrees. The configuration described above makes it possible to radiate the fan-shaped pulse light PL, which is polarized to be parallel to a fan plane, to the entire target visual field OV.

As described above, it is preferable that an optical path of the fan-shaped pulse light radiation unit 12A passes through the fan-shaped beam generator 12c after passing through the one-dimensional scanning device 12b. Since the spot light SL is polarized in a direction perpendicular to the scanning direction, when the spot light SL is reflected by the one-dimensional scanning device 12b, polarization thereof is not changed, so that there is an advantage that polarizability is not deteriorated. In the opposite case, an incident angle when light spread into the fan shape is incident on a mirror surface of the one-dimensional scanning device 12b is different between a center part of the fan shape and an end part thereof. As a result, toward an end part of the mirror surface, the polarization direction deviates from a direction parallel to the reflection surface, so that the polarizability is deteriorated by reflection.

In the present embodiment, the MEMS mirror element is, for example, an electromagnetic type, and a deflection angle of the mirror is changed by controlling an amount of flowing current. In an electrostatic or piezoelectric type, the deflection angle of the mirror is able to be changed by controlling a voltage to be applied. The MEMS mirror element has an advantage that a size of a device is able to be reduced.

Control of the one-dimensional scanning device 12b is included in the imaging unit 21A. This is because it is necessary to perform synchronous control of the deflection angle of the mirror and the light receiving system 20A so that a signal from an object, which is irradiated with the fan-shaped pulse light PL, is detected. Note that, as to the synchronous control, a control device may be separately provided and the one-dimensional scanning device 12b and the imaging unit 21A may be controlled from the control device, for example. Alternatively, the both may be directly controlled from the external system 2, and there is no limitation to the method in which the control is performed by the imaging unit 21A. The one-dimensional scanning device 12b may be a constituent such as a polygon mirror, a liquid crystal waveguide system, or the like, which is different from the MEMS mirror element.

It is also possible to adopt a constituent different from the Powell lens as the fan-shaped beam generator 12c. However, use of the Powell lens has an advantage that a size of a device is reduced or solidity thereof is improved because there is no movable unit and pulse light is able to be spread by a relatively small optical component.

Note that, the light source 11A may be a light source that generates pulse light that is emitted in a non-polarization state, is transmitted through a polarization filter or a polarization splitter, is brought into a linear polarization state, and is thereby linearly polarized. However, as described above, it is preferable that the linearly polarized pulse light is generated by using the semiconductor laser chip and directly output since there is no loss of light. Additionally, there is also an advantage that a size of the light source 11A is able to be reduced. The light source 11A is a light source capable of emitting pulse light like a laser or an LED. A wavelength of the light emitted by the light source 11A may be that of visible light of a single color or that of visible light including 3 colors of RGB, and an infrared ray having a wavelength of about 700 nm to 1000 nm is preferable. The infrared ray is invisible to a human eye and therefore does not disturb, and has an advantage that, as the wavelength thereof is longer, safety for an eye of an animal increases. Furthermore, in general, as the wavelength is longer, intensity of background light is lowered, which is preferable. Moreover, it is preferable that a wavelength range of the light emission is narrow and temperature fluctuation of a peak wavelength of the light emission is little. As a result, an infrared laser is preferable. Particularly, VCSEL (Vertical Cavity Surface Emitting LASER) in which a wavelength range of light emission is narrow and temperature fluctuation of a peak wavelength of the light emission is little is preferable. Though not illustrated in FIG. 1, a temperature control circuit that performs temperature control of the light source 11A may be added in order to suppress the temperature fluctuation of the peak wavelength of the light emission.

The light source 11A emits pulse light in synchronization with the imaging unit 21A. Light emission intensity and a pulse width (full width at half maximum of a light emission time) may be variable. Here, the pulse width of the pulse light is about 1 nsec to several hundreds nsec. Peak power of the pulse light is about several W to several hundreds W.

When the rainy weather camera 1A acquires data of 30 frames per second, and pixel resolution of each of the frames is 0.05 degrees and the spread angle in the vertical direction θv is 24 degrees, 480 pieces of fan-shaped pulse light PL-1 to fan-shaped pulse light PL-480 whose traveling angles in the vertical direction are different are radiated in one frame, for example. A time allocated to radiation of fan-shaped pulse light PL-k (k is a positive integral number) is 1/14400 (=1/30/480) second. An angle of the reflection surface of the one-dimensional scanning device 12b is changed to a setting value during this time, and the light source 11A is caused to emit pulse light. Each fan-shaped pulse light PL-k radiates one shot of pulse to an object to acquire an image signal, so that a light emission cycle of the pulse light is approximately 14.4 kHz.

(Light Receiving System)

Next, a detailed structure of the light receiving system 20A will be described with reference to FIG. 1 described above.

As illustrated in FIG. 1, in general, the image forming optical system 22 of the light receiving system 20A is a lens. In accordance with a size of the light receiving unit 21a and a viewing angle (FOV), the image forming optical system 22 is able to select a focal distance and an F number. The image forming optical system 22 preferably has high transmittance and less aberration at a center wavelength of an optical bandpass filter 24. Note that, FIG. 1 illustrates the lens as the image forming optical system 22, the image forming optical system 22 may be a reflective optical system other than the lens.

Next, in the present embodiment, the polarization filter 23 is disposed in front of the image forming optical system 22. The polarization filter 23 transmits polarization light perpendicular to the polarization direction of the fan-shaped pulse light PL.

Here, it is preferable that background light outside a band is reduced by disposing the optical bandpass filter 24 on an optical path from the polarization filter 23 to the light receiving unit 21a.

That is, the optical bandpass filter 24 has a transmission band with a band of a fixed width around a peak wavelength of the fan-shaped pulse light PL as a center. A width (full width at half maximum of wavelength distribution of transmittance) of the transmission band is several nm to several tens nm and, specifically, is preferably about 10 nm to 20 nm in particular. In general, in a case of an outdoor operation, an operation temperature range is widened. As a result, the peak wavelength of the fan-shaped pulse light PL changes with a temperature, so that wavelength distribution of the fan-shaped pulse light PL needs to fall within the transmission band at least in the operation temperature range. Then, by disposing the optical bandpass filter 24, the background light outside the band is able to be reduced.

In the present embodiment, in a case where the VCSEL (Vertical Cavity Surface Emitting LASER) is used, a temperature shift of a peak wavelength is about 0.07 nm/degree, a full width at half maximum of peak of light emission is about 1 nm, and a temperature shift of a center wavelength of the transmission band of the optical bandpass filter 24 is 0.025 nm/degree. Thus, even in consideration of a temperature zone from 85° C. to −40° C., a relative wavelength shift between the peak wavelength and the center wavelength of the transmission band is about 5.6 nm, and the optical bandpass filter 24 with the transmission band of about 10 nm is usable. That is, the optical bandpass filter 24 with a narrow transmission band is usable, so that a signal of background light is able to be suppressed, making it possible to obtain an image up to a more distant place.

Note that, a positional relationship between the polarization filter 23, the image forming optical system 22, and the optical bandpass filter 24 does not need to be in the order illustrated in FIG. 1. For example, the order may be reversed, or the polarization filter 23 and the optical bandpass filter 24 may be arranged in front of the image forming optical system 22. Alternatively, the polarization filter 23 and the optical bandpass filter 24 may be incorporated inside the image forming optical system 22. Furthermore, the polarization filter 23 may be disposed on a front surface of the light receiving unit 21a, and various kinds of arrangement are possible. As the polarization filter 23, a wire grid type that has a wavelength range of a near infrared ray, high transmittance, and an excellent extinction effect is preferable. In a case where the background light is not strong such as a case where use of the rainy weather camera 1A is restricted to use in heavy rain, the optical bandpass filter 24 is able to be omitted.

(Imaging Unit)

Figure 3:
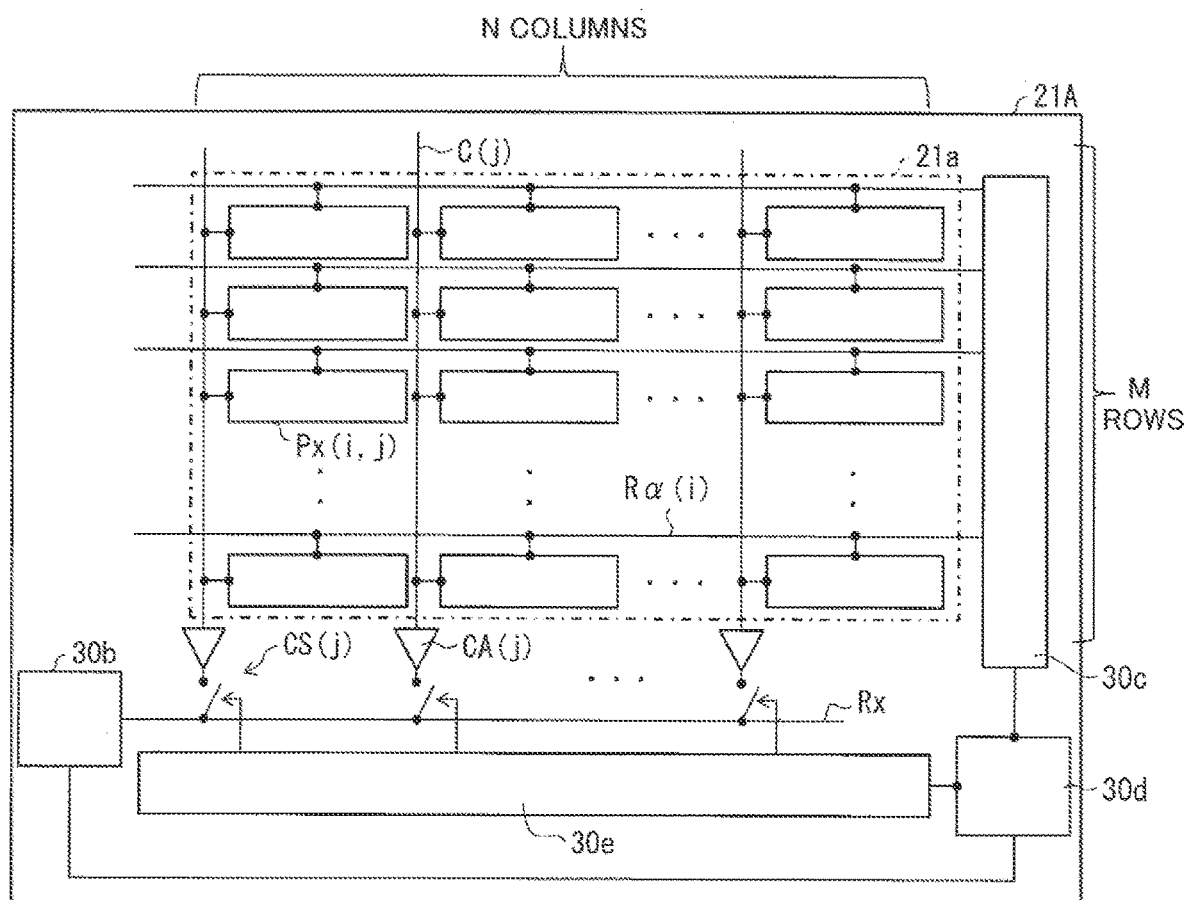
FIG. 3 is a view illustrating a configuration of an imaging unit in a light receiving system included in the rainy weather camera.

Next, a detailed structure of the imaging unit 21A of the light receiving system 20A will be described with reference to FIG. 3. FIG. 3 is a view illustrating a configuration of the imaging unit 21A of the light receiving system 20A included in the rainy weather camera 1A.

The imaging unit 21A of the present embodiment is different from an ordinary CMOS image sensor, and is a sensor that receives light from a line-shaped part of the target visual field OV, which is illuminated by the fan-shaped pulse light PL, and outputs an image signal.

As an example, as illustrated in FIG. 3, in the light receiving unit 21a of the imaging unit 21A, pixels Px(i,j) are arranged in two-dimensional matrix with M rows and N columns. Thus, an optical signal from the target visual field OV is projected by the image forming optical system 22 onto the two-dimensional matrix with M rows and N columns. Not all the pixels Px(i,j) are activated at a time. That is, since pulse light radiated toward the target visual field OV is the fan-shaped pulse light PL, only pixels in a row k corresponding to the fan-shaped pulse light PL-k are activated. Note that, here, for convenience, the fan-shaped pulse light PL is numbered from 1 to Ns (=M) from a lowermost part to an uppermost part and i of corresponding Px(i,j) is numbered from 1 to M from an uppermost part to a lowermost part. Such correspondence is made here because the both have reversed order due to the image forming optical system 22 which lies therebetween. Note that, it is possible to change this denotation depending on properties of the image forming optical system 22.

In the present embodiment, when the fan-shaped pulse light PL-k is radiated, pixels Px(k,j) are activated. The activation of Px(k,j) means a series of steps that, in at least Px(k,j), the light receiving unit 21a receives an optical signal, accumulates an electric signal subjected to photoelectric conversion, and outputs the resultant from the pixels to an outside. Note that, detailed description thereof will be given later.

As illustrated in FIG. 3, the imaging unit 21A includes the light receiving unit 21a that performs photoelectric conversion, a circuit that conveys the output of the light receiving unit 21a to a signal storage processing circuit 30b, and the like. As the light receiving unit 21a, a photodiode is used, and an avalanche photodiode (an analog mode, a Geiger mode) may be used.

As a circuit for selecting the pixels Px(k,j) of the row k corresponding to the fan-shaped pulse light PL-k, a row selection circuit 30c is provided in the imaging unit 21A so as to be adjacent to the light receiving unit 21a. The row selection circuit 30c conveys a selected row to each of the pixels Px(i,j) with a row control signal Ra(i).

The row control signal Ra(i) is not limited to a single signal line and may be a plurality of signal lines that are different in polarity or voltage. In synchronization with an operation of the one-dimensional scanning device 12b of the fan-shaped pulse light radiation unit 12A, the row selection circuit 30c selects the k-th row to be activated. A signal for synchronization is generated from a control unit 30d.

As illustrated in FIG. 3, each of column signal lines C(j) is connected to a horizontal signal line Rx through a column circuit CA(j) for performing noise canceling or amplification, via a column selection switch CS(j). Moreover, the horizontal signal line Rx is connected to the signal storage processing circuit 30b. Note that, the column selection switch CS(j) is controlled by a column selection circuit 30e.

Figure 4:
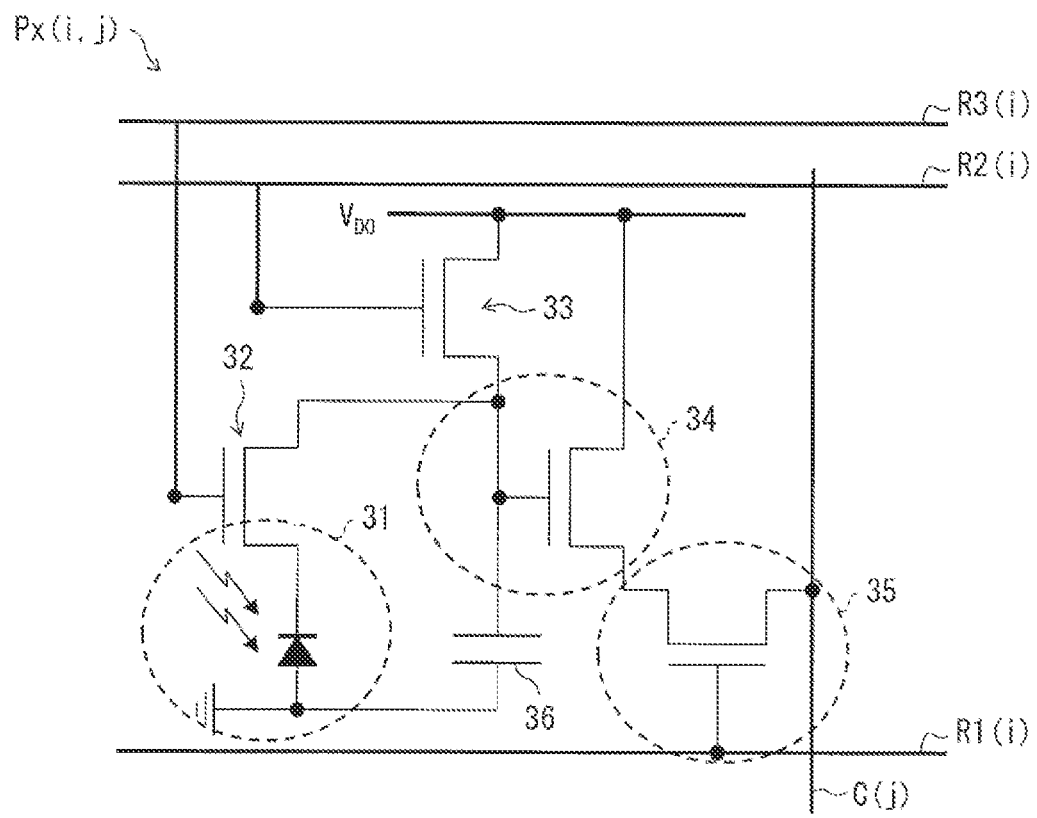
FIG. 4 is a circuit diagram illustrating a configuration of a pixel in the imaging unit.
Figure 5:
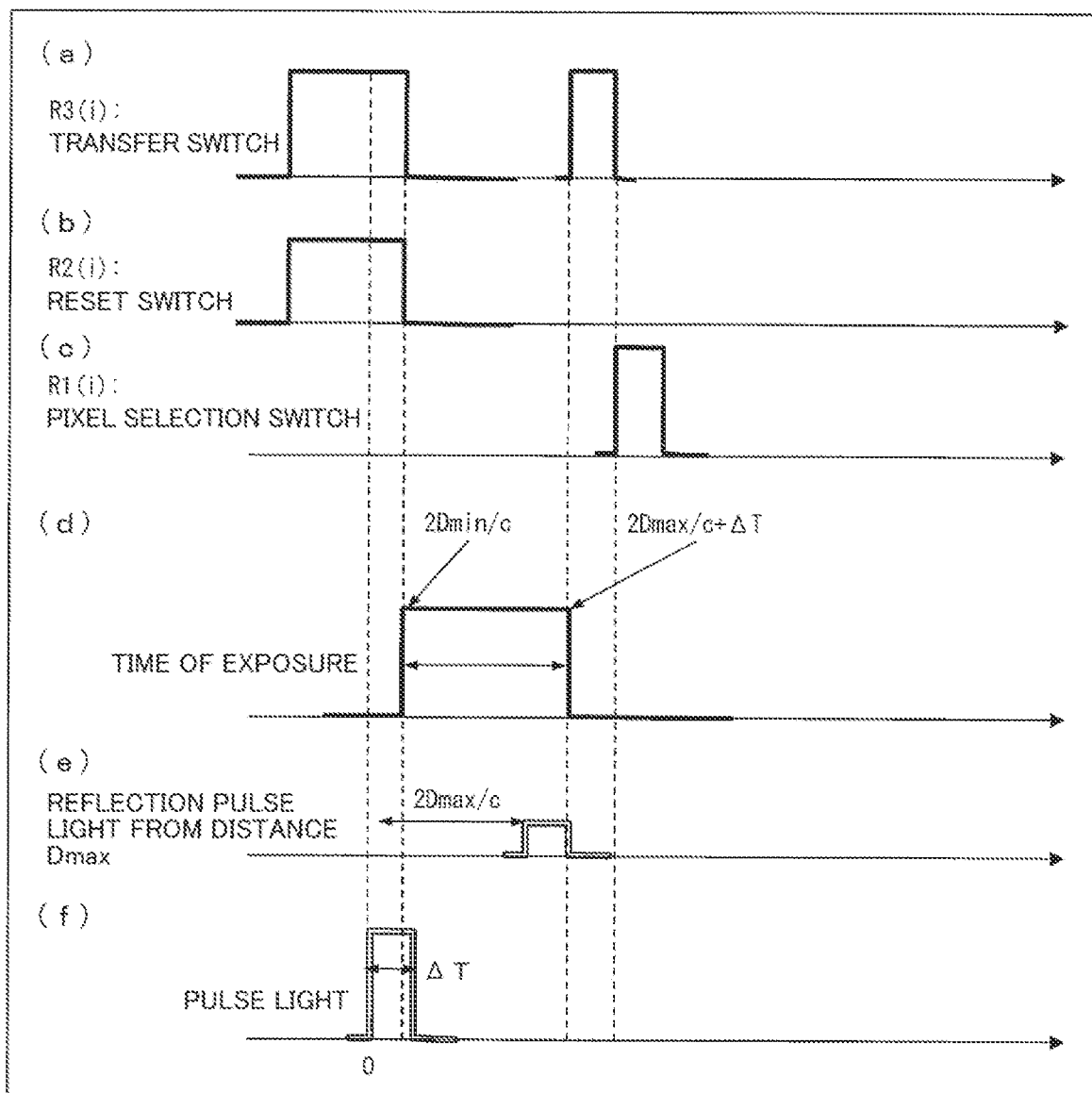
FIGS. 5(a) to 5(f) are timing charts illustrating a driving timing of a pixel in the imaging unit.

Next, a detailed structure of the pixel Px(i,j) will be described with reference to FIG. 4. FIG. 4 is a circuit diagram illustrating a configuration of the pixel Px(i,j) in the imaging unit 21A.

As illustrated in FIG. 4, the pixel Px(i,j) is constituted by a light receiving element 31, a transfer switch 32, a reset switch 33, a pixel amplifier 34, a pixel selection switch 35, a capacitance 36, and the like.

The imaging unit 21A of the present embodiment is basically the same as a COMS image sensor of a rolling shutter type. A different point lies in that a time of exposure of a row to be activated is short. Exposure of each of the rows is performed during a time immediately after start of radiation of corresponding fan-shaped pulse light PL until $$(2 \cdot Dmax/c) + \Delta T.$$

Here, c is the velocity of light, Dmax is a maximum distance to a measurement object, and $\Delta T$ is a pulse width of the fan-shaped pulse light PL.

For example, in a case where the pulse width of the fan-shaped pulse light PL is $\Delta T=100$ nsec and a distance up to 50 m is set as a measurement object, the time of exposure is 433 nsec to the maximum. After this time, reflection light of the fan-shaped pulse light PL from the measurement object does not return, so that, even when the time is extended, a signal of background light is increased, resulting in that only an SN ratio is reduced.

An operation timing related to a pixel Px(k,j) in the imaging unit 21A, which has the configuration described above, will be described with reference of FIGS. 5(a) to 5(f). FIGS. 5(a) to 5(f) are timing charts illustrating a driving timing of a pixel in the imaging unit 21A.

In the rainy weather camera 1A of the present embodiment, in a case that the imaging unit 21A starts exposure at the same time as start of radiation of the fan-shaped pulse light PL, even a nearest object is able to be set as an object to be photographed. However, when necessity of photographing the nearest object is low and only an object at a distance farther than a certain distance Dmin is photographed, the exposure may be delayed by 2·Dmin/c from a timing of starting the radiation as illustrated in FIGS. 5(d), 5(e), and 5(f).

Then, in the present embodiment, the exposure starts from a timing when the transfer switch 32 and the reset switch 33 are turned off from an on-state as illustrated in FIGS. 5(a) and 5(b) and ends at a timing when the transfer switch 32 is turned on and the pixel selection switch 35 is turned on as illustrated in FIGS. 5(a) and 5(c). Note that, row control signals R1(i), R2(i), and R3(i) control on/off of the pixel selection switch 35, the reset switch 33, and the transfer switch 32, respectively.

(Explanation of Effect)

Figure 6:
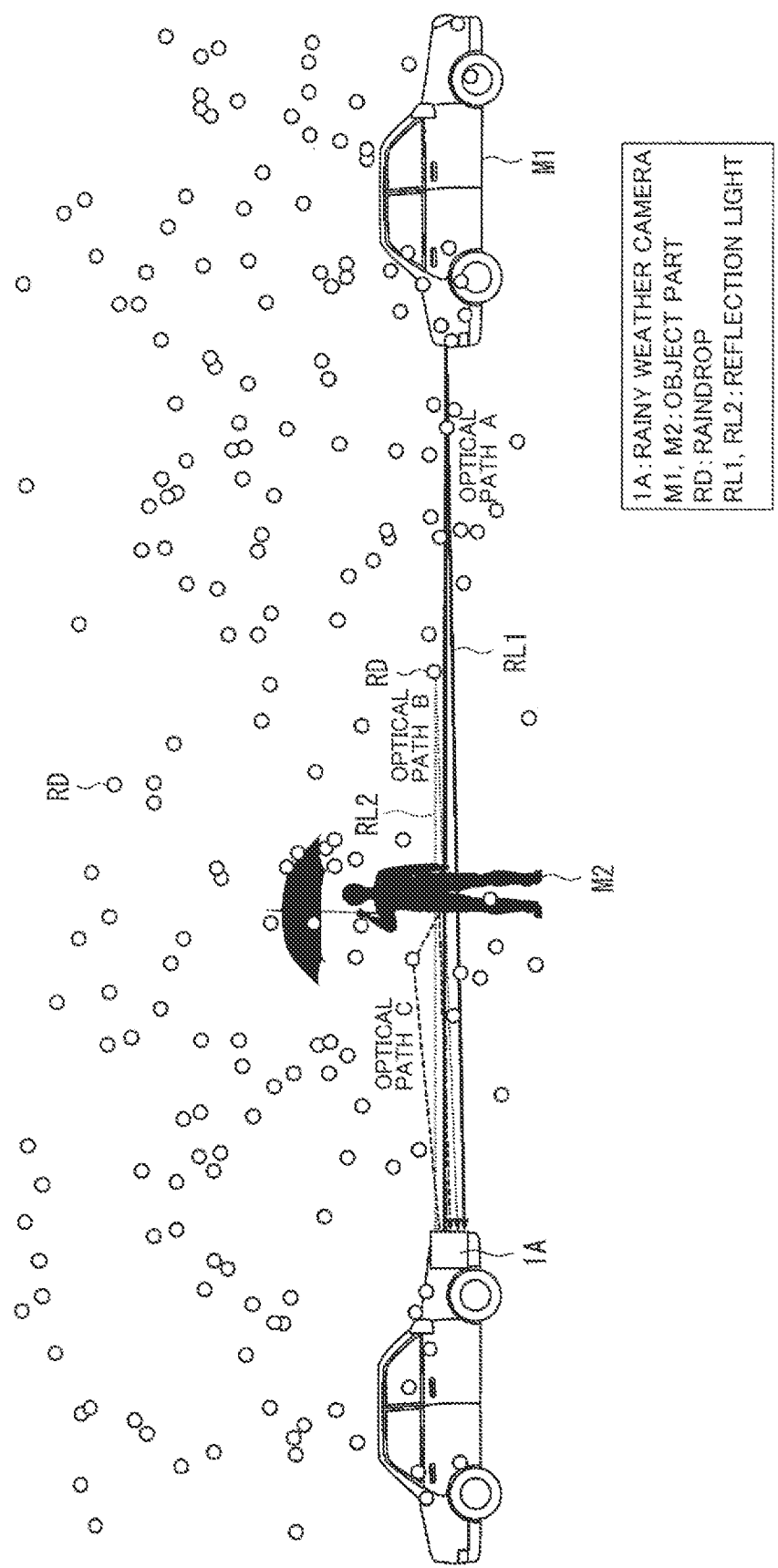
FIG. 6 is a side view illustrating optical paths of output light when imaging is performed by using the rainy weather camera.

An effect of performing imaging in rainy weather by using the rainy weather camera 1A of the present embodiment will be described with reference to FIG. 6. FIG. 6 is a side view illustrating optical paths of output light when imaging is performed by using the rainy weather camera 1A.

As indicated by an optical path A in FIG. 6, light that the fan-shaped pulse light PL reaches up to an object M1 and returns to the rainy weather camera 1A by reflection is obtained in a case where the light is almost perpendicularly incident on the object M1 and perpendicularly reflected as illustrated in the same figure. Except for a case of a mirror or a polished metal plate, such reflection light RL1 is diffusedly reflected and the polarizability of the fan-shaped pulse light PL is normally lost. Accordingly, though intensity is reduced by half by the polarization filter 23, the light is able to be detected as a signal.

However, as indicated by an optical path B, in a case where the fan-shaped pulse light PL is reflected by a raindrop RD or the like before reaching to the object M1 and returns in a direction of the rainy weather camera 1A, the fan-shaped pulse light PL is mostly mirror-reflected because of physical properties of a water droplet or a snowflake. Thus, reflection light RL2 in such a case keeps a polarization state of the fan-shaped pulse light PL. Accordingly, the reflection light RL2 is able to be excluded by the polarization filter 23. This is because the polarization state of the fan-shaped pulse light PL is orthogonal to a polarization state of the polarization filter 23 in the present embodiment.

Note that, as to multireflection light by the raindrop RD or an object part, polarizability thereof is lost due to the multireflection. Thus, the multireflection light is not able to be excluded by the polarization filter 23. However, by receiving the fan-shaped pulse light PL-k only by the pixels Px(k,j) on radiation thereof, it is possible to significantly reduce the multireflection light caused by the raindrop RD or the object part.

That is, as indicated by an optical path C, a possibility that light, which is reflected by an object M2 that is close or the raindrop RD by the radiation of the fan-shaped pulse light PL-k, is reflected in a direction of the pixel Px(k,j) by another raindrop RD or the object M2 is not zero but extremely small. The reason is that, in order to receive such light, it is necessary that reflection occurs multiple times on a plane on which the fan-shaped pulse light PL-k travels, but a possibility of such a case is extremely small.

Here, not in a case of providing a configuration in which illumination is performed linearly and light reception is performed linearly, for example, in a case where an image sensor of a global shutter type is used, it is necessary to keep an exposure state while the entire target visual field OV is scanned with the fan-shaped pulse light PL. As a result, in the image sensor of the global shutter type, multireflection light from pulse light other than the fan-shaped pulse light PL-k also reaches to the predetermined pixels Px(k,j). As described above, an amount of such multireflection of only one line is not large, but an amount obtained by adding amounts of all scanning operations is unignorable. In this manner, in the present embodiment, multireflection light is also able to be suppressed by performing illumination linearly and taking in only a signal of the illuminated line as a signal.

As to whether or not the effect described above is able to be actually realized, an experiment was conducted to determine whether or not an image of an object was able to be captured by removing water droplets. In the experiment, as indicated in Example described later, the object had a reflection surface having diffuse reflecting properties with a reflectivity of 50% and was placed at a certain distance from the rainy weather camera 1A in an environment having water droplets with average size of 5 mm, which was assumed to be precipitation of 50 mm/hour and is said to be dangerous to drive a car.

As a result, it was confirmed that a clear image is able to be captured up to a relatively long distance by the rainy weather camera 1A of the present embodiment in rainy weather. The rainy weather camera 1A aims to detect an object at a distance of at least 30 m or more, and preferably 50 m or more in an environment where it is raining. Accordingly, the relatively long distance means at least 30 m or more, and preferably 50 m or more.

As described above, the rainy weather camera 1A serving as the imaging device in the present embodiment includes: the light source 11A that emits pulse light; the fan-shaped pulse light radiation unit 12A serving as a radiation unit that performs scanning in one direction with the pulse light emitted by the light source 11A, spreads the scanned pulse light in a direction perpendicular to the scanning direction when the scanning is performed, and radiates the pulse light, which is in a state of being polarized in the direction perpendicular to the scanning direction, to an object; the imaging unit 21A that receives reflection light from the object to perform exposure to a pixel; and the polarization filter 23 that transmits light polarized in a direction parallel to the scanning direction among the reflection light received by the imaging unit 21A. Then, the imaging unit 21A performs exposure only to a pixel which is synchronized with the scanning with the pulse light.

Thus, in a case where the scanning is performed in a longitudinal direction as the one direction, the pulse light emitted from the light source 11A is spread in a horizontal direction, which is the direction perpendicular to the scanning direction, and radiated to the object. Moreover, the radiated pulse light is polarized in the direction perpendicular to the scanning direction. That is, the scanning is performed in the longitudinal direction, so that the pulse light has polarization parallel to the horizontal direction. As a result, fan-shaped horizontal polarization pulse light having a predetermined thickness is radiated while the scanning is performed in the longitudinal direction, thus making it possible to give light on the entire object.

On the other hand, light reflected from the object is incident on the imaging unit 21A via the polarization filter 23 to perform exposure to a pixel of the imaging unit 21A.

As a result, the rainy weather camera 1A of the present embodiment radiates the fan-shaped horizontal polarization pulse light having the predetermined thickness while the scanning is performed in the longitudinal direction, thus making it possible to radiate pulse light having a large light amount also to a part of the object. Furthermore, the imaging unit 21A performs exposure only to the pixel which is synchronized with the scanning with the pulse light, so that the pixel is exposed with only reflection light of the pulse light with which also the part of the object is irradiated with the large light amount.

Moreover, in the present embodiment, the polarization filter 23 that transmits the light that is included in the reflection light received by the imaging unit 21A and polarized to be parallel to the scanning direction is included. Thus, a polarization direction of reflection light by a raindrop, which is returned, and a polarization direction of the polarization filter 23 are orthogonal to each other, so that the returned reflection light by the raindrop is blocked by the polarization filter 23 and is not exposed to the pixel of the imaging unit 21A. As a result, the reflection light by the raindrop is able to be removed.

Note that, as to multireflection light by the raindrop, which is reflection light from the raindrop and is reflected by another object and is then received, the polarizability thereof is lost due to the multireflection. Thus, the multireflection light is not able to be excluded by the polarization filter 23. However, in the present embodiment, the imaging unit 21A performs exposure only to the pixel which is synchronized with the scanning with the pulse light, so that it is possible to significantly reduce the multireflection light compared to a case where exposure is simultaneously performed for an entire irradiation area.

Accordingly, it is possible to provide the rainy weather camera 1A that is able to obtain a clear image in a relatively long distance in an environment of precipitation. Thereby, an automobile accident or the like is able to be prevented.

In the rainy weather camera 1A of the present embodiment, the pulse light is an infrared ray. Thereby, because of being invisible to a human eye, the infrared ray does not disturb. Additionally, as a wavelength of the infrared ray or the like is longer, safety for an eye of an animal increases. Furthermore, as the wavelength is longer, intensity of background light is also lowered, which is preferable.

Moreover, in the rainy weather camera 1A of the present embodiment, the light source 11A is preferably a semiconductor laser chip that radiates light that is linearly polarized. This makes it possible to easily output pulse light having linear polarization, by adjusting a direction of the semiconductor laser chip.

Furthermore, in the rainy weather camera 1A of the present embodiment, the fan-shaped pulse light radiation unit 12A includes the one-dimensional scanning device 12b that performs scanning in one direction with the pulse light emitted by the light source 11A, and the fan-shaped beam generator 12c that spreads, in the direction perpendicular to the scanning direction, the pulse light for the scanning, and radiates the pulse light to the object.

Thereby, the pulse light emitted from the light source passes through the scanning device and the beam generator in this order. As a result, it is possible to efficiently spread spot light emitted from the light source 11A into the fan shape.

Moreover, the rainy weather camera 1A of the present embodiment preferably includes the optical bandpass filter 24 that transmits pulse light of a wavelength band with a fixed width in the reflection light.

In this manner, by providing the optical bandpass filter 24 that transmits only the light of the wavelength band with the fixed width, which includes a center wavelength of the pulse light, before incidence to a pixel, it is possible to cut most of the background light. Accordingly, an SN ratio of an image that is obtained is able to be increased.

Moreover, in the rainy weather camera 1A of the present embodiment, the scanning direction in which the fan-shaped pulse light radiation unit 12A performs scanning with the pulse light in the one direction is the vertical direction.

For example, in a case where the rainy weather camera 1A is applied to a car camera, height of a general building or the like that is to be an object is limited. Thereby, it is possible to make an angle of the scanning narrow.

Moreover, in the rainy weather camera 1A of the present embodiment, the fan-shaped beam generator 12c is preferably a Powell lens.

That is, a shape of the Powell lens is very similar to a cylindrical prism having a rounded roof. Thus, the Powell lens functions as a so-called laser line generator and is able to extend a laser beam in a linear shape with uniform intensity. Specifically, while intensity of both end portions of a beam line that is generated is increased, intensity of a center portion thereof is lowered. Accordingly, it is suitable to spread the pulse light emitted from the light source into the fan shape.

Furthermore, in the rainy weather camera 1A of the present embodiment, the one-dimensional scanning device 12b is preferably a MEMS mirror element. The MEMS mirror element is a mirror of an electromagnetic driving system for which a MEMS (Micro-Electro-Mechanical Systems) technique is applied. Microminiaturization is able to be achieved by disposing a magnet below the mirror. In a magnetic field of the magnet, in a case of flowing a current in a coil around the mirror, Lorentz force is generated by Fleming's rule, so that the mirror is able to be driven. This makes it possible to achieve a wide optical deflection angle and a high mirror reflectivity together with low power consumption.

Moreover, it is preferable that the rainy weather camera 1A of the present embodiment is operable in rainfall, snowfall, or fog. Thereby, a clear image is able to be obtained by avoiding influence of rain, snow, or fog, thus making it possible to exert the effect particularly in rainfall, snowfall, or fog.

Embodiment 2

Another embodiment of the invention will be described as follows with reference to FIGS. 7 to 9. Note that, a configuration is the same as that of Embodiment 1 described above, except for a point described in the present embodiment. Moreover, for convenience of description, a member having the same function as that of the member illustrated in the drawings of Embodiment 1 described above will be given the same reference sign and description thereof will be omitted.

(Outline of Rainy Weather Camera)

A rainy weather camera 1B of the present embodiment is different in configurations of a pulse light illumination system 10B and a light receiving system 20B compared to configurations of the rainy weather camera 1A of Embodiment 1 described above.

A configuration of the rainy weather camera 1B of the present embodiment will be described with reference to FIGS. 7 to 9. FIG. 7 is a block diagram illustrating an entire configuration of the rainy weather camera 1B in the present embodiment. FIG. 8 is a perspective view illustrating a configuration of a fan-shaped pulse light radiation unit 12B of the pulse light illumination system 10B included in the rainy weather camera 1B. FIG. 9 is a view illustrating a configuration of an imaging unit 21B of the light receiving system 20B included in the rainy weather camera 1B.

In the rainy weather camera 1A of Embodiment 1 described above, the fan plane of the fan-shaped pulse light PL is spread in the horizontal direction and the scanning is performed in the vertical direction. On the other hand, in the rainy weather camera 1B of the present embodiment, as illustrated in FIG. 8, a fan plane of a fan-shaped pulse light PLv is spread in the vertical direction and scanning is performed in the horizontal direction. Moreover, also as to a polarization direction of the fan-shaped pulse light PLv, light is polarized in the horizontal direction in the rainy weather camera 1A of Embodiment 1, but light is linearly polarized in the vertical direction in the rainy weather camera 1B of the present embodiment.

Figure 7:
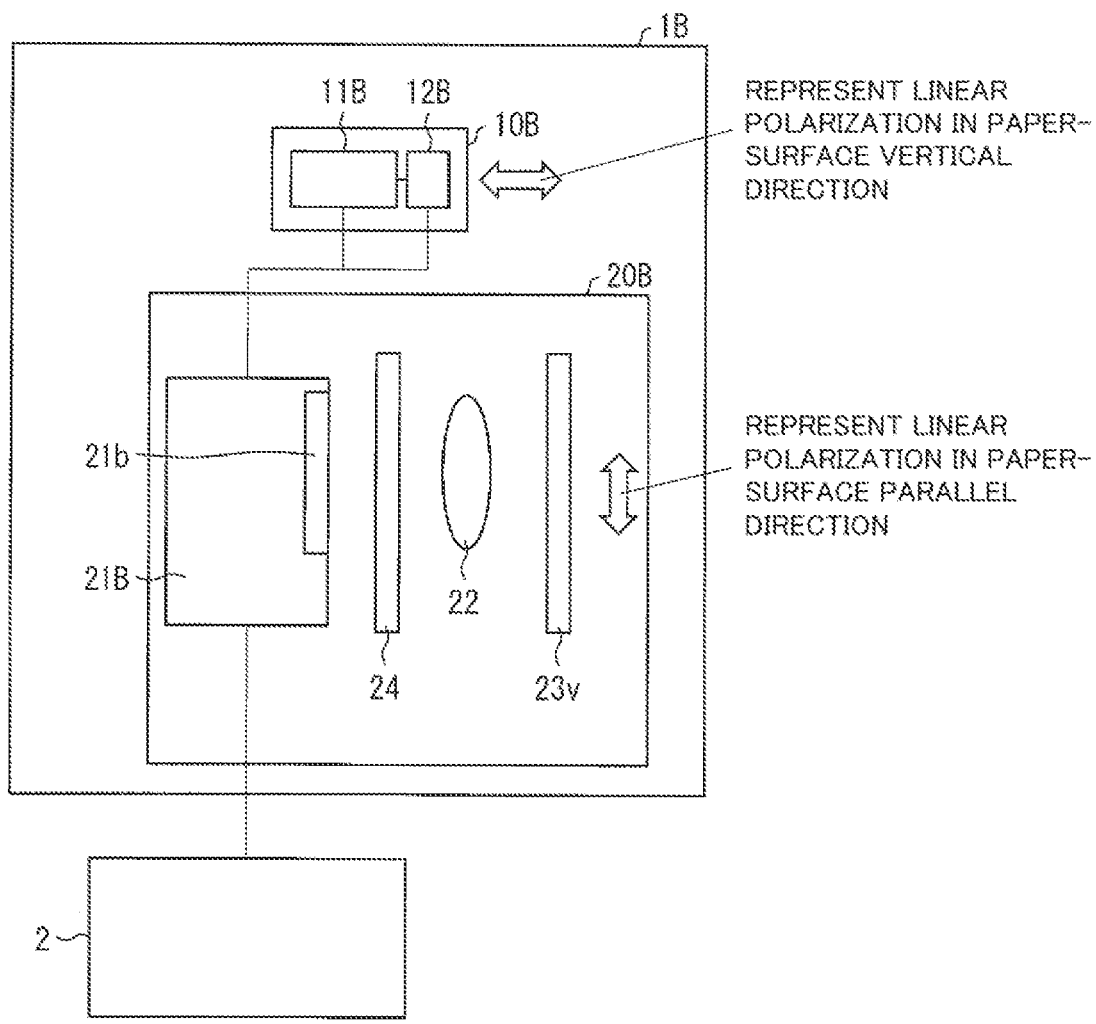
FIG. 7 is a block diagram illustrating an entire configuration of a rainy weather camera in Embodiment 2 of the invention.

Furthermore, the present embodiment is different from Embodiment 1 in that a polarization direction of a polarization filter 23v is a direction perpendicular to the polarization direction of the fan-shaped pulse light PLv, and is disposed in the horizontal direction in light receiving system 20B illustrated in FIG. 7. As a result, the scanning direction is changed in the present embodiment, so that longitudinal and transverse directions in circuit arrangement of a light receiving unit 21b are switched in the imaging unit 21B compared to the imaging unit 21A, as illustrated in FIG. 9.

Note that, there is no change from the rainy weather camera 1A of Embodiment 1 in other configurations, for example, such as an advantage of using the infrared ray, an advantage of using the semiconductor laser, an order on an optical path of a one-dimensional scanning device 13b and a fan-shaped beam generator 13c, an advantage of using the MEMS mirror element as the one-dimensional scanning device 13b, and an advantage of using the Powell lens as the fan-shaped beam generator 13c.

(Pulse Light Illumination System)

Hereinafter, each component of the rainy weather camera 1B of the present embodiment will be described in detail. First, the pulse light illumination system 10B will be described.

Figure 8:
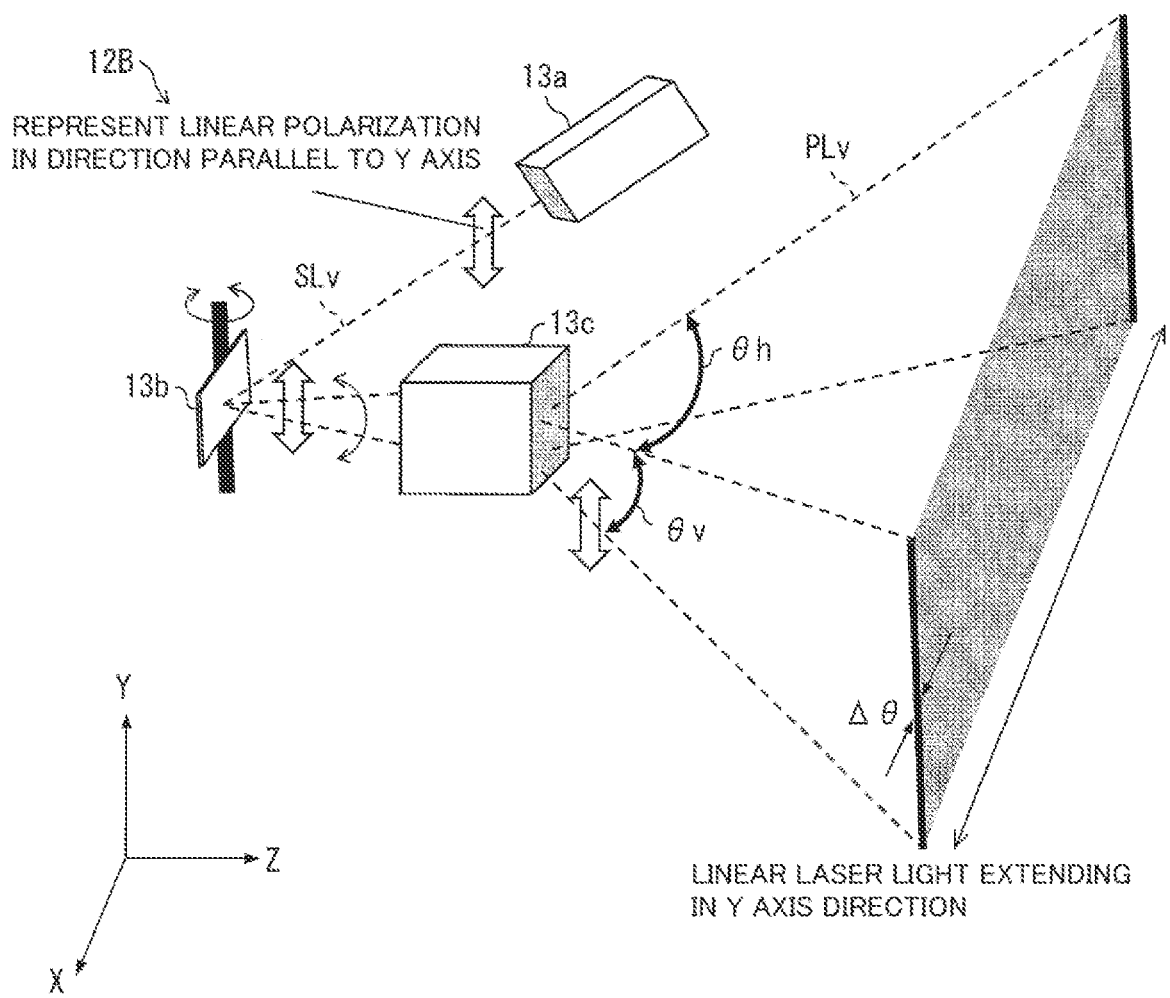
FIG. 8 is a perspective view illustrating a configuration of a fan-shaped pulse light radiation unit of a pulse light illumination system included in the rainy weather camera.

As illustrated in FIG. 8, in the fan-shaped pulse light radiation unit 12B of the pulse light illumination system 10B of the present embodiment, an optical axis from a light source 11B illustrated in FIG. 7 to the fan-shaped beam generator 13c through a collimate light generator 13a and the one-dimensional scanning device 13b is disposed on the X-Z plane. That is, the optical axis is disposed on the Y-Z plane in the rainy weather camera 1A of Embodiment 1, and the rainy weather camera 1B of the present embodiment is different from the rainy weather camera 1A in this point.

Moreover, in the present embodiment, the light source 11B of the pulse light illumination system 10B emits the fan-shaped pulse light PLv whose polarization direction is different from that of Embodiment 1.

That is, in a case where non-polarization light is subjected to linear polarization with a polarizer, a direction of the polarizer is different from that of Embodiment 1 by 90 degrees, and light that is polarized in the vertical direction is output. Here, in a case where the light source 11B has an edge-emitting semiconductor laser chip, by adjusting a direction of the chip so that a semiconductor active layer of the semiconductor laser chip is parallel to the vertical direction, it is possible to output pulse light polarized in the vertical direction.

In the present embodiment, the fan-shaped pulse light PLv is spread into the fan shape in a vertical plane, and a spread angle thereof is set as a spread angle in the vertical direction θv. On the other hand, a spread angle in the horizontal plane is small and a beam thickness thereof is set as Δθ (full width at half maximum). Here, the spread angle in the vertical direction θv>>the beam thickness Δθ (full width at half maximum) is provided.

By performing scanning in the horizontal direction with the fan-shaped pulse light PLv within the spread angle in the horizontal plane θh, it is possible to sequentially radiate the light to the target visual field OV at the spread angle in the horizontal plane θh and at the spread angle in the vertical direction θv. Note that, the spread angle in the horizontal plane θh>the beam thickness Δθ (full width at half maximum) is provided.

In a case where pieces of fan-shaped pulse light PLv to be radiated at different angles in the horizontal direction need to be distinguished from each other, the pieces of fan-shaped pulse light PLv are denoted as fan-shaped pulse light PLv-1 to fan-shaped pulse light PLv-Na. Na indicates a total number of times of scanning in the horizontal direction.

The fan-shaped pulse light PLv is preferably uniform in the target visual field OV, but detection sensitivity in a place where light intensity is strong is high. Thus, in a case where there is a place that needs to be particularly gazed in the target visual field OV, the fan-shaped pulse light PLv is also able to have light intensity distribution in which intensity near the place is increased.

As illustrated in FIG. 8, the fan-shaped pulse light radiation unit 12B includes at least the collimate light generator 13a that shapes light from the light source 11B into almost parallel spot light SLv (in the X-Z plane), the one-dimensional scanning device 13b that deflects the spot light SLv in the horizontal direction (X direction), and the fan-shaped beam generator 13c that spreads the spot light SLv, a traveling angle of which in the horizontal direction is changed by the one-dimensional scanning device 13b, into the fan shape. In FIG. 8, the active layer of the semiconductor laser chip is disposed to be parallel to a Y-axis. The collimate light generator 13a includes a collimator lens and keeps a polarization state of the light source 11B. The one-dimensional scanning device 13b is constituted by, for example, a MEMS mirror element including a reflection surface that rotationally moves around one axis (which is set as the Y-axis) in the vertical plane (Y-Z plane).

A polarization direction of the spot light SLv which is incident on the reflection surface of the one-dimensional scanning device 13b is parallel to the reflection surface, so that a polarization state thereof is not changed by reflection.

The fan-shaped beam generator 13c includes, for example, a Powell lens. For example, the spot light SLv whose divergence angle is about 1.5 degrees and whose diameter at an entry of the Powell lens with an aperture of 6 mm is about 1.0 mm is formed by the collimate light generator 13a so that laser light is deflected by ±16 degrees with respect to the horizontal plane by the one-dimensional scanning device 13b constituted by the MEMS mirror element.

The Powel lens radiates the laser light at the spread angle in the vertical direction θv=24 degrees and the beam thickness Δθ(full width at half maximum)=0.05 degrees. Thus, the fan-shaped pulse light PLv is able to be radiated to a range with the spread angle in the horizontal plane θh=32 degrees and the spread angle in the vertical direction θv=24 degrees.

The configuration described above makes it possible to radiate the fan-shaped pulse light PLv, which is polarized to be parallel to a fan plane, to the entire target visual field OV. Though the MEMS mirror element has a difference in a deflection angle or the like, a device similar to that of Embodiment 1 is able to be used.

The light source 11B emits pulse light in synchronization with the imaging unit 21B. Light emission intensity or a pulse width (full width at half maximum of a light emission time) may be variable. Here, the pulse width of pulse light is about 1 nsec to several hundreds nsec. Peak power of the pulse light is about several W to several hundreds W.

In the present embodiment, when the rainy weather camera 1B acquires data of 30 frames per second, and pixel resolution of each of the frames is 0.05 degrees and the spread angle in the horizontal plane θh is 32 degrees, 640 pieces of fan-shaped pulse light PLv-1 to fan-shaped pulse light PLv-640 whose traveling angles in the horizontal direction are different are radiated in one frame, for example. A time allocated to radiation of fan-shaped pulse light PLv-k is 1/19200 second. An angle of the reflection surface of the one-dimensional scanning device 13b is changed to a setting value during this time, and the light source 11B is caused to emit pulse light. Each fan-shaped pulse light PLv-k radiates one shot of pulse to an object to acquire an image signal, so that a light emission cycle of the pulse light is approximately 19.2 kHz.

(Imaging Unit)

Figure 9:
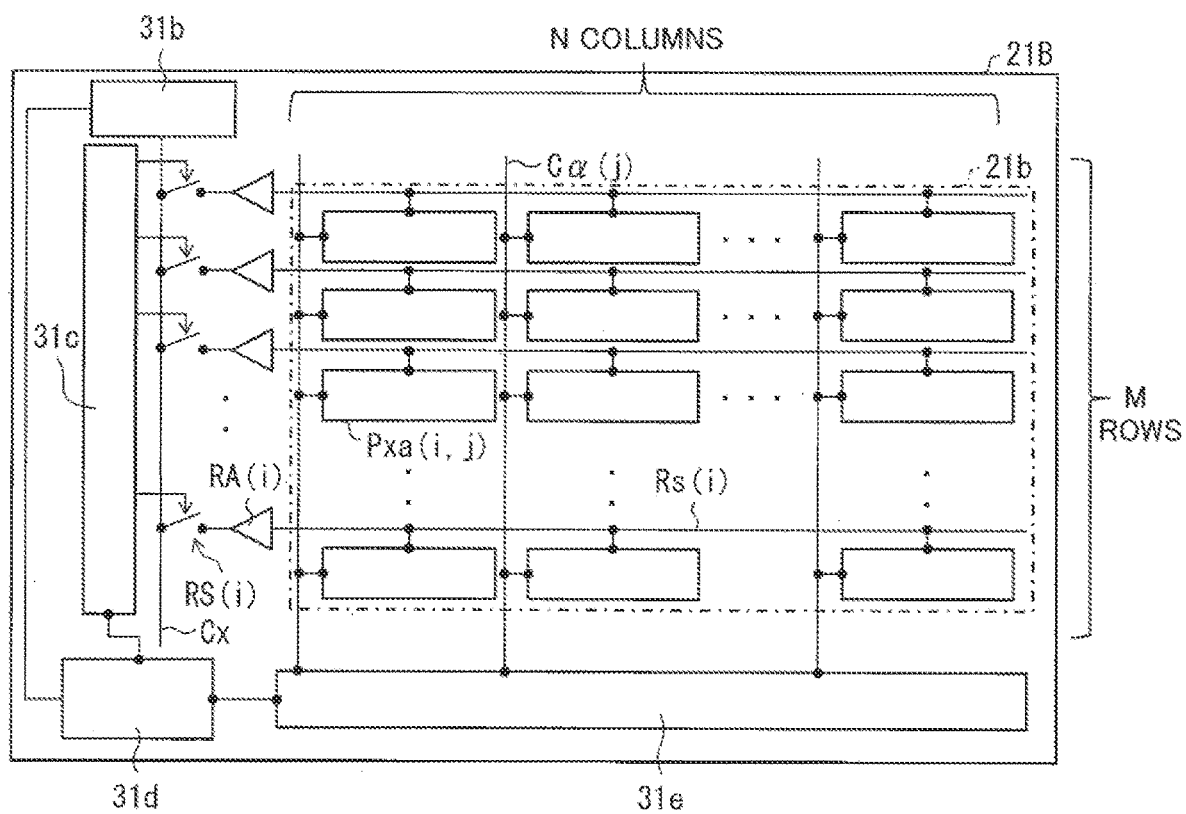
FIG. 9 is a view illustrating a configuration of an imaging unit in a light receiving system included in the rainy weather camera.

As illustrated in FIG. 9, in the light receiving unit 21b of the imaging unit 21B of the present embodiment, pixels Pxa(i,j) are arranged in two-dimensional matrix with M rows and N columns. Thus, a point where an optical signal from the target visual field OV is projected by the image forming optical system 22 onto the two-dimensional matrix with M rows and N columns is the same as that of Embodiment 1. Note that, for convenience, the fan-shaped pulse light PLv is numbered from 1 to Na (=N) from left to right of the target visual field and j of corresponding Pxa(i,j) is numbered from 1 to M from left to right. Such correspondence is made because the both have reversed order due to the image forming optical system 22 which lies therebetween. Note that, it is possible to change this order depending on properties of the image forming optical system 22.

In the present embodiment, since only a pixel of a column k, which corresponds to the fan-shaped pulse light PLv-k that is spread in the vertical direction, receives reflection light of the pulse light, a role of a row and a role of a column in the circuit are switched from those of Embodiment 1 from a viewpoint that corresponding pixels Pxa(i,k) are activated for each column.

Specifically, the pixel Pxa(i,j) has a signal line (row signal line Rs(i)) disposed alongside of a row and a control signal line (Cα(i)) disposed alongside of a column in contrast with the pixel Px(i,j) of Embodiment 1. Note that, the pixel Pxa(i,j) is the same as the pixel Px(i,j) of Embodiment 1 except for this configuration, so that description related to a circuit configuration of an inside thereof will be omitted.

Moreover, in the present embodiment, as a circuit for selecting the pixels Pxa(i,k) of the column k corresponding to the fan-shaped pulse light PLv-k, a column selection circuit 31e is provided so as to be adjacent to the light receiving unit 21b. Additionally, a column control signal Cα(j) that conveys a signal of the column selection circuit 31e to each of the pixels Pxa(i,j) is provided. In synchronization with an operation of the one-dimensional scanning device 13b of the fan-shaped pulse light radiation unit 12B, the column control signal Cα(j) selects the column k to be activated. A signal for synchronization is generated from a control unit 31d.

The row signal line RS(i) is connected to a vertical signal line Cx through a row circuit RA(i) for performing noise canceling or amplification, and via a row selection switch RS(i), and the vertical signal line Cx is connected to a signal storage processing circuit 31b. The row selection switch RS(i) is controlled by the row selection circuit 31c.

As described above, though the rows and the columns are reversed in arrangement, the imaging unit 21B has a configuration similar to that of the imaging unit 21A of Embodiment 1 and basically the same technique is applicable.

Moreover, the rainy weather camera 1B of the present embodiment is different from the rainy weather camera 1A of Embodiment 1 in the scanning direction with the fan-shaped pulse light PLv, and also in the direction of polarization by 90 degrees, but an excellent imaging result is able to be obtained in an environment of precipitation, completely similarly.

As described above, in the rainy weather camera 1B of the present embodiment, the scanning direction when scanning with the pulse light is performed in one direction by the fan-shaped pulse light radiation unit 12B is the horizontal direction.

For example, in a case where the rainy weather camera 1B is applied to a car camera, when only a front side of a road is imaged as the object, a width of the road is limited. It is thereby possible to make an angle of scanning narrow.

Embodiment 3

Figure 10:
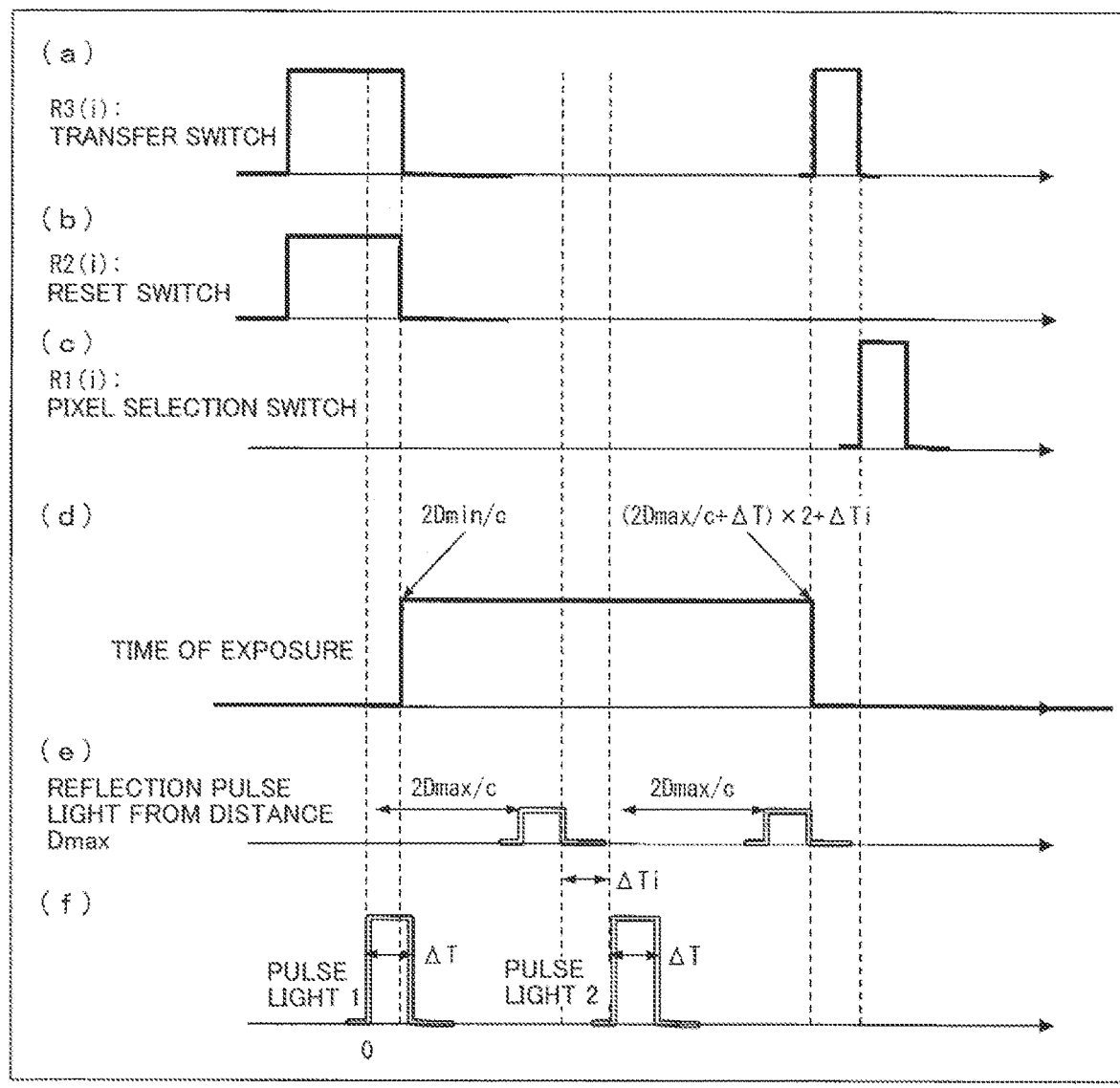
FIGS. 10(a) to 10(f) are timing charts illustrating a driving timing of a pixel in the imaging unit.

Still another embodiment of the invention will be described as follows with reference to FIG. 10. Note that, a configuration is the same as that of Embodiment 1 described above, except for a point described in the present embodiment. Moreover, for convenience of description, a member having the same function as that of the member illustrated in the drawings of Embodiment 1 described above will be given the same reference sign and description thereof will be omitted.

The rainy weather camera 1A of the present embodiment is the same as the rainy weather camera 1A of Embodiment 1 described above in a configuration from a viewpoint of hardware, but is different in a scanning method and a driving method of the imaging unit 21A.

The scanning method of the fan-shaped pulse light radiation unit 12A and the driving method of the imaging unit 21A in the rainy weather camera 1A of the present embodiment will be described with reference to FIGS. 10(a) to 10(f). FIGS. 10(a) to 10(f) are timing charts illustrating a driving timing of the pixel in the imaging unit 21A.

Considered is that the rainy weather camera 1A of the present embodiment is applied as a camera for a vehicle, for example. In the camera for the vehicle, if it is intended to cover an entire width of a road as the target visual field OV, even when the road is at a close distance, a wide viewing angle is required. However, in a case where only a distant place is to be gazed, a narrower viewing angle is sufficient. Particularly, when an amount of rainfall is large and visibility is poor, there is a case where it is required to monitor a surface of a road as far as possible.

In such a case, the pulse light illumination system 10A is able to perform scanning with the fan-shaped pulse light PL not for the entire target visual field OV, but, for example, for any half of the target visual field OV in a concentrated manner.

In this case, as illustrated in FIGS. 10(a) to 10(f), continuous two shots of pulse light 1 and pulse light 2 are used to expose to the target visual field OV, so that signal intensity of an irradiation region is able to be twice. Note that, in the present embodiment, hereinafter, this is referred to as "2 pulse exposure".

Thereby, it is possible to significantly extend a distance that is able to be imaged. That is, the maximum distance Dmax to be measured is longer than that of Embodiment 1. For example, under a condition that is the same as that of Embodiment 1, the maximum distance Dmax is about 1.4 times.

Here, in Embodiment 1, the light emission frequency of the fan-shaped pulse light PL is 14.4 kHz, but a light emission interval between the pulse light 1 and the pulse light 2 is required to be shortened. This is because, in a case where the light emission frequency is 14.4 kHz, there is a time of about 69000 nsec between continuous shots of light emission, and noise due to background light exceeds a signal when the light emission interval remains as it is. Accordingly, it is preferable that emission of the pulse light 2 is performed after emission of the pulse light 1 has been performed and a time, which is longer than 2·Dmax/c+ΔT (about several hundreds nsec) and is short as much as possible, has elapsed. Here, a difference between a time difference between light emission timings of the pulse light 1 and the pulse light 2, and 2·Dmax/c+ΔT is set as ΔTi. ΔTi is preferably short as much as possible.

Note that, it is possible to perform exposure with further more continuous shots of pulse light. Moreover, for example, when the number of frames is reduced by half, it is also possible to perform 2 pulse light exposure with respect to the entire target visual field OV in accordance thereto. Furthermore, in a range of a capability of the pulse light illumination system 10A and a restriction of a safety standard related to laser radiation, it is possible to set a light emission system and a scanning system depending on a purpose.

Note that, in the aforementioned description, description that the 2 pulse light exposure is adopted for the rainy weather camera 1A of Embodiment 1 has been given. However, it is not necessarily limited thereto, and the 2 pulse light exposure enables similar exposure control with respect to a plurality of pieces of pulse light also to hardware of the rainy weather camera 1B of Embodiment 2.

Examples

In order to verify the effect of the rainy weather camera 1A of the present embodiment, by assuming precipitation of 50 mm/hour, which is said to be dangerous to drive a car, an experiment was conducted to determine whether or not an image of an object that had a reflection surface having diffuse reflecting properties of a reflectivity of 50%, which was placed at a certain distance from the rainy weather camera 1A, was able to be captured by removing water droplets in an environment in which an average of particle sizes of water droplets was 5 mm.

As an experimental condition, the light source 11A was caused to emit laser light with a wavelength of 800 nm so as to have a pulse width (full width at half maximum) of 100 nsec and peak power of 100 W. It was set that the spread angle in the horizontal plane θh was 32 degrees and the beam thickness Δθ (full width at half maximum) was 0.05 degrees, and then a range of the spread angle in the vertical direction θv, which was 24 degrees, was scanned. Note that, in the vertical direction, scanning with 480 steps was performed.

The light receiving system 20A had a specific configuration in which a pixel size of the imaging unit 21A was 10 μm square, a size of the photodiode was equivalent to about 7 μm square, 640 pixels were arranged in the horizontal direction, and 480 pixels were arranged in the vertical direction. That is, this was equivalent to VGA. A size of the light receiving unit 21a was 6.4 mm×4.8 mm. A lens with a focal distance f=11.2 mm and F=1.2 was used for the image forming optical system 22. A viewing angle was 32 degrees. From the pixel size, angular resolution in a visual field was 0.05 degrees and was the same as that of the beam thickness Δθ (full width at half maximum) of the fan-shaped pulse light PL. The optical bandpass filter 24 that had a center wavelength of 800 nm and a transmission band with a width of 10 nm was disposed.

A timing of exposure by the imaging unit 21A started at the same time when the light source 11A emitted light and the exposure was performed for up to 433 nsec. In a case where there is no emission of the fan-shaped pulse light PL, a level of a signal was completely the same as that of dark time noise.

As a result, even in a distance of 50 m, though signal intensity was weak (signal intensity of about twice a noise level), the image of the object was able to be captured. In the distance of 50 m, a signal amount was reduced by about 10% compared to a case where there is no rain, and it is considered that such an amount of light was deviated from an optical path by scattering caused by a raindrop.

On the other hand, as a 2 pulse exposure experiment, when Dmin=3 m, Dmax=70 m, and ΔTi=10 nsec were provided, the pulse light 2 was emitted after the pulse light 1 had been emitted and then 577 nsec had elapsed. A time of exposure was 1123 nsec. Signal intensity at the distance of 50 m was almost twice compared to 1 pulse exposure described above, so that an image was clearer. Furthermore, also at a maximum distance of 70 m, it was possible to identify the object.

CONCLUSION

An imaging device (rainy weather camera 1A, 1B) in an aspect 1 of the invention includes: a light source 11A, 11B that emits pulse light; a radiation unit (fan-shaped pulse light radiation unit 12A, 12B) that performs scanning in one direction with the pulse light emitted by the light source 11A, 11B, spreads, in a direction perpendicular to the scanning direction, the pulse light for the scanning when the scanning is performed, and radiates the pulse light, which is in a state of being polarized in the direction perpendicular to the scanning direction, to an object; an imaging unit 21A, 21B that receives reflection light from the object to perform exposure to a pixel; and a polarization filter 23, 23v that transmits light that is included in the reflection light received by the imaging unit 21A, 21B and polarized to be parallel to the scanning direction, in which the imaging unit 21A, 21B performs exposure only to a pixel which is synchronized with the scanning with the pulse light.

According to the aforementioned configuration, the radiation unit performs the scanning in the one direction with the pulse light emitted by the light source, spreads, in the direction perpendicular to the scanning direction, the pulse light for the scanning when the scanning is performed, and radiates the pulse light, which is in the state of being polarized in the direction perpendicular to the scanning direction, to the object.

Thus, in a case where the scanning is performed in, for example, a longitudinal direction as the one direction, the pulse light emitted from the light source is spread in a horizontal direction, which is a direction perpendicular to the scanning direction, and radiated to the object. Moreover, the radiated pulse light is polarized in the direction perpendicular to the scanning direction. That is, in a case where the scanning is performed in the longitudinal direction, the pulse light has polarization parallel to the horizontal direction. As a result, fan-shaped horizontal polarization pulse light having a predetermined thickness is radiated while the scanning is performed in the longitudinal direction, thus making it possible to give light on the entire object.

On the other hand, light reflected from the object is incident on the imaging unit via the polarization filter to perform exposure to a pixel of the imaging unit.

As a result, since a conventional imaging device irradiates an entire object, an amount of light radiated to a part of the object is small, resulting in that an amount of reflection light which is reflected by the part of the object and input to an imaging unit is also small.

On the other hand, as described above, in the aspect of the invention, the fan-shaped horizontal polarization pulse light having the predetermined thickness is radiated while the scanning is performed in the longitudinal direction, thus making it possible to radiate pulse light having a large light amount also to a part of an object. Furthermore, in the aspect of the invention, the imaging unit performs exposure only to the pixel which is synchronized with the scanning with the pulse light, so that only reflection light of the pulse light, which is radiated with a large light amount also to the part of the object, is exposed to a pixel.

As a result, the aspect of the invention makes it possible that irradiation intensity in a distant place is high and a measurement range is set to be a long distance.

Then, in general, in the case that the pulse light is radiated to an object, since there are many cases that a surface of the object is a rough surface, reflection light becomes diffusive light. Thus, a polarization state of the reflection light is also changed. On the other hand, reflection light when the pulse light is radiated to a raindrop has no change in a polarization state of the reflection light because a surface of the raindrop is able to be considered as a mirror surface. As a result, the reflection light when the pulse light is radiated to a raindrop returns to the imaging unit while a horizontal polarization state is kept. Here, in the aspect of the invention, the polarization filter that transmits the light that is included in the reflection light received by the imaging unit and polarized to be parallel to the scanning direction is included. Thus, a polarization direction of the returned reflection light by the raindrop is orthogonal to a polarization direction of the polarization filter, so that the returned reflection light by the raindrop is not exposed to a pixel of the imaging unit by being blocked by the polarization filter. As a result, it is possible to remove the reflection light by the raindrop.

Note that, as to multireflection light of a raindrop, which is received after the reflection light by a raindrop is reflected by another object, polarizability thereof is lost due to the multireflection. Thus, the multireflection light is not able to be excluded by the polarization filter. However, in the aspect of the invention, the imaging unit performs exposure only to the pixel which is synchronized with the scanning with the pulse light, so that it is possible to significantly reduce the multireflection light compared to a case where an entire irradiation region is simultaneously exposed.

Accordingly, it is possible to provide an imaging device that is able to obtain a clear image in a relatively long distance in an environment of precipitation.

In the imaging device (rainy weather camera 1A, 1B) of an aspect 2 of the invention, the pulse light is preferably an infrared ray.

Thereby, because of being invisible to a human eye, the infrared ray does not disturb. Moreover, as a wavelength of the infrared ray or the like is longer, safety for an eye of an animal increases. Furthermore, as the wavelength is longer, intensity of background light is lowered, which is preferable.

In the imaging device (rainy weather camera 1A, 1B) of an aspect 3 of the invention, it is preferable that the light source 11A, 11B is a semiconductor laser chip that radiates light that is linearly polarized.

Thereby, by adjusting a direction of the semiconductor laser chip, it is possible to easily output the pulse light that is linearly polarized.

In the imaging device (rainy weather camera 1A, 1B) of an aspect 4 of the invention, the radiation unit (fan-shaped pulse light radiation unit 12A, 12B) includes: a scanning device (one-dimensional scanning device 12b, 13b) that performs scanning in one direction with the pulse light emitted by the light source 11A, 11B; and a beam generator (fan-shaped beam generator 12c, 13c) that spreads, in a direction perpendicular to the scanning direction, the pulse light for the scanning and radiates the pulse light to the object.

Thereby, the pulse light emitted from the light source passes through the scanning device and the beam generator in this order. As a result, the scanning with the pulse light emitted from the light source is performed in the one direction by using the scanning device, and thereafter the pulse light for the scanning is spread in a plane perpendicular to the scanning direction by using the beam generator, and radiated to the object. Accordingly, it is possible to efficiently spread spot light, which is emitted from the light source, into the fan shape.

The imaging device (rainy weather camera 1A, 1B) of an aspect 5 of the invention preferably includes a filter (optical bandpass filter 24) that transmits pulse light of a wavelength band with a fixed width in the reflection light.

In general, in a case where imaging by the imaging device is performed outdoors, even when it is raining, it is not always dark and background light is present, so that an operation temperature range is widened. As a result, a peak wavelength of the pulse light changes with temperature, so that there is a possibility that background light outside a band is incident on a pixel. Then, by providing the filter that transmits only the light of the wavelength band with the fixed width, which includes a center wavelength of the pulse light, before incidence to a pixel, it is possible to cut most of the background light.

Accordingly, an SN ratio of an image that is obtained is able to be increased.

In the imaging device (rainy weather camera 1A) of an aspect 6 of the invention, the scanning direction when the radiation unit (fan-shaped pulse light radiation unit 12A) performs the scanning with the pulse light in the one direction is a vertical direction.

For example, in a case where the imaging device is applied to a car camera, height of a general building or the like that is to be an object is limited. Thereby, it is possible to make an angle of the scanning narrow.

In the imaging device (rainy weather camera 1B) of an aspect 7 of the invention, the scanning direction when the radiation unit (fan-shaped pulse light radiation unit 12B) performs the scanning with the pulse light in the one direction is a horizontal direction.

For example, in a case where the imaging device is applied to a car camera, when only a front side of a road is imaged as the object, a width of the road is limited. It is thereby possible to make an angle of scanning narrow.

In the imaging device (rainy weather camera 1A, 1B) of an aspect 8 of the invention, the beam generator (fan-shaped beam generator 12c, 13c) is preferably a Powell lens.

That is, a shape of the Powell lens is very similar to a cylindrical prism having a rounded roof. Thus, the Powell lens functions as a so-called laser line generator and is able to extend a laser beam in a linear shape with uniform intensity. Specifically, while intensity of both end portions of a beam line that is generated is increased, intensity of a center portion thereof is lowered.

Accordingly, it is suitable to spread the pulse light emitted from the light source into the fan shape.

In the imaging device (rainy weather camera 1A, 1B) of an aspect 9 of the invention, the scanning device (one-dimensional scanning device 12b, 13b) is preferably a MEMS mirror element.

The MEMS mirror element is a mirror of an electromagnetic driving system for which a MEMS (Micro-Electro-Mechanical Systems) technique is applied. Microminiaturization is able to be achieved by disposing a magnet below the mirror. In a case of flowing a current in a coil around the mirror in a magnetic field of the magnet, Lorentz force is generated by Fleming's rule, so that the mirror is able to be driven. This makes it possible to achieve a wide optical deflection angle and a high mirror reflectivity together with low power consumption.

In the imaging device (rainy weather camera 1A, 1B) of an aspect 10 of the invention, the imaging unit is able to perform the exposure with a plurality of pieces of pulse light.

Thereby, it is possible to make signal intensity of an irradiation region plural times, thus making it possible to extremely extend a distance that is able to be imaged.

The imaging device (rainy weather camera 1A, 1B) of an aspect 11 of the invention is preferably operable in rainfall, snowfall, or fog.

Thereby, a clear image is able to be acquired by avoiding influence of rain, snow, or fog, thus making it possible to exert the effect particularly in rainfall, snowfall, or fog.

The invention is not limited to each of the embodiments described above, and may be modified in various manners within the scope indicated in the claims and an embodiment achieved by appropriately combining technical means disclosed in each of different embodiments is also encompassed in the technical scope of the invention. Further, by combining the technical means disclosed in each of the embodiments, a new technical feature may be formed.

REFERENCE SIGNS LIST 1A, 1B rainy weather camera (imaging device)
10A, 10B pulse light illumination system 11A, 11B light source
12a, 13a collimate light generator
12A, 12B fan-shaped pulse light radiation unit (radiation unit)
12b, 13b one-dimensional scanning device (scanning device)
12c, 13c fan-shaped beam generator (beam generator)
20A, 20B light receiving system
21A, 21B imaging unit
21a, 21b light receiving unit
30b, 31b signal storage processing circuit
30c, 31c row selection circuit
30d, 31d control unit
30e, 31e column selection circuit
22 image forming optical system
23, 23v polarization filter
24 optical bandpass filter (filter)
31 light receiving element
32 transfer switch
33 reset switch
34 pixel amplifier
35 pixel selection switch
36 capacitance
M1, M2 object
RD raindrop
Px(i,j) pixel
Pxa(i,j) pixel
θh spread angle in horizontal plane
θv spread angle in vertical direction
Δθ beam thickness

The invention claimed is:

1. An imaging device comprising:
a light source that emits pulse light;
a radiation unit that performs scanning in one direction with the pulse light emitted by the light source, spreads, in a direction perpendicular to the scanning direction, the pulse light for the scanning when the scanning is performed, and radiates the pulse light, which is in a state of being polarized in the direction perpendicular to the scanning direction, to an object;
an imaging unit that receives reflection light from the object and performs exposure to a pixel; and
a polarization filter that transmits light that is included in the reflection light received by the imaging unit and polarized to be parallel to the scanning direction, wherein
the imaging unit performs exposure only to a pixel which is synchronized with the scanning with the pulse light.

2. The imaging device according to claim 1, wherein a time of exposure of the pixel is equal to or less than $2 \cdot D_{max}/c + \Delta T$, where $D_{max}$ (m) is a maximum distance to be measured, $c$ (m/sec) is a velocity of light, and $\Delta T$ is a light emission time of the pulse light.

3. The imaging device according to claim 1, wherein the imaging unit activates a pixel belonging to a single row or a single column onto which the reflection light from the object caused by the radiation of the pulse light is projected, and performs exposure to the pixel in synchronization with the pulse light.

4. The imaging device according to claim 1, wherein the pulse light is an infrared ray.

5. The imaging device according to claim 1, wherein the light source is a semiconductor laser chip that radiates light that is linearly polarized.

6. The imaging device according to claim 1, wherein the radiation unit includes
a scanning device that performs the scanning in the one direction with the pulse light emitted by the light source; and
a beam generator that spreads, in the direction perpendicular to the scanning direction, the pulse light for the scanning and radiates the pulse light to the object.

7. The imaging device according to claim 1, further comprising:
a filter that transmits pulse light of a wavelength band with a fixed width in the reflection light.

8. The imaging device according to claim 1, wherein the scanning direction when the radiation unit performs the scanning with the pulse light in the one direction is a vertical direction.

9. The imaging device according to claim 1, wherein the scanning direction when the radiation unit performs the scanning with the pulse light in the one direction is a horizontal direction.

10. The imaging device according to claim 6, wherein the beam generator is a Powell lens.

11. The imaging device according to claim 6, wherein the scanning device is a MEMS mirror element.

12. The imaging device according to claim 1, wherein the imaging unit performs the exposure with a plurality of pieces of pulse light.

13. The imaging device according to claim 12, wherein a light emission interval between the plurality of pieces of pulse light is equal to or more than $2 \cdot D_{max}/c + \Delta T$, where $D_{max}$ (m) is a maximum distance to be measured, $c$ (m/sec) is a velocity of light, and $\Delta T$ is a light emission time of each pulse light.

14. The imaging device according to claim 1, wherein the imaging device is operable in rainfall, snowfall, or fog.

* * * * *